(12) United States Patent
Pang

(10) Patent No.: US 11,609,885 B2
(45) Date of Patent: Mar. 21, 2023

(54) TIME SERIES DATABASE COMPRISING A PLURALITY OF TIME SERIES DATABASE SCHEMAS

(71) Applicant: VMware, Inc., Palo Alto, CA (US)

(72) Inventor: Clement Pang, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 14 days.

(21) Appl. No.: 16/517,353

(22) Filed: Jul. 19, 2019

(65) Prior Publication Data

US 2021/0019289 A1 Jan. 21, 2021

(51) Int. Cl.
*G06F 7/00* (2006.01)
*G06F 16/21* (2019.01)
*G06F 16/28* (2019.01)
*G06F 16/2458* (2019.01)

(52) U.S. Cl.
CPC ........ *G06F 16/211* (2019.01); *G06F 16/2477* (2019.01); *G06F 16/283* (2019.01)

(58) Field of Classification Search
CPC .......... G06F 16/24568; G06F 16/2228; G06F 16/2477; G06F 16/211; G06F 16/283
USPC ......................... 707/694, 736, 737, 803, 718
See application file for complete search history.

(56) References Cited

U.S. PATENT DOCUMENTS

| | | |
|---|---|---|
| 9,271,142 B1 | 2/2016 | Broch et al. |
| 10,007,590 B2 | 6/2018 | Pattnaik et al. |
| 10,037,305 B2 | 7/2018 | Leonard et al. |
| 10,073,903 B1 | 9/2018 | Arye et al. |
| 10,437,797 B1 | 10/2019 | Johnson et al. |
| 10,642,852 B2 | 5/2020 | Marquardt et al. |
| 10,853,373 B1 | 12/2020 | Bhatia et al. |
| 10,884,894 B2 | 1/2021 | Walters et al. |
| 10,977,279 B2 | 4/2021 | Tamayo |
| 2007/0250524 A1 | 10/2007 | Le |
| 2008/0189239 A1 | 8/2008 | Bawa et al. |
| 2010/0161101 A1 | 6/2010 | Pouyez et al. |
| 2011/0295795 A1 | 12/2011 | Venkatasubramanian et al. |
| 2013/0086104 A1 | 4/2013 | Morrison et al. |
| 2014/0297642 A1 | 10/2014 | Lum et al. |
| 2015/0039651 A1 | 2/2015 | Kinsely et al. |
| 2015/0040052 A1 | 2/2015 | Noel et al. |
| 2015/0052173 A1* | 2/2015 | Leonard .............. G06F 16/2477 707/792 |

(Continued)

OTHER PUBLICATIONS

Galindo-Legaria, et al., Orthogonal Optimization of Subqueries and Aggregation, ACM SIGMOD 2001, May 21-24, https://doi.org/10.1145/376284.375748, pp. 571-581 (Year: 2011).

(Continued)

*Primary Examiner* — Md I Uddin

(57) ABSTRACT

In a computer-implemented method for maintaining a time series database including a plurality of time series database schemas, time series data including data points are received at an ingestion node of a time series database, the data points comprising a plurality of dimensions. A plurality of time series database schemas of the time series database is determined for storing the time series data. The time series data is ingested according to the plurality of time series database schemas, wherein each data point is stored according to each time series database schema of the plurality of time series database schemas, such that the time series database comprises multiple instances of each data point.

19 Claims, 18 Drawing Sheets

(56) References Cited

U.S. PATENT DOCUMENTS

| | | |
|---|---|---|
| 2015/0213109 A1 | 7/2015 | Kassko et al. |
| 2016/0092484 A1 | 3/2016 | Finkler |
| 2016/0104076 A1 | 4/2016 | Maheshwari et al. |
| 2016/0328432 A1 | 11/2016 | Raghunathan |
| 2017/0315749 A1* | 11/2017 | Valine .................. G06F 16/278 |
| 2018/0181641 A1 | 6/2018 | Das et al. |
| 2018/0246950 A1 | 8/2018 | Arye et al. |
| 2018/0285685 A1 | 10/2018 | Singh et al. |
| 2018/0322400 A1 | 11/2018 | Shahand et al. |
| 2019/0251198 A1 | 8/2019 | Shamsutdinov |
| 2019/0325045 A1 | 10/2019 | Williams et al. |
| 2020/0167355 A1 | 5/2020 | Rath et al. |
| 2020/0167360 A1 | 5/2020 | Rath et al. |
| 2020/0167361 A1 | 5/2020 | Princehouse et al. |
| 2020/0201850 A1 | 6/2020 | Haggie et al. |
| 2020/0285619 A1 | 9/2020 | Teyer |
| 2020/0341986 A1* | 10/2020 | Yang ................. G06F 16/24568 |

OTHER PUBLICATIONS

Jensen, et al., "ModelarDB: Modular Model-Based Time Series Management with Spark and Cassandra", Proceedings of the VLDB Endowment, vol. 11, Issue 11, https://doi.org/10.14778/3236187.3236215, Jul. 2018, 1688-1701.

Han, et al., Efficient Mining of Partial Periodic Patterns in Time Series Database, IEEE (Year: 1999), 1999, 10 pgs.

* cited by examiner

TIME SERIES DATABASE COMPRISING A PLURALITY OF TIME SERIES DATABASE SCHEMAS

BACKGROUND

Management, monitoring, and troubleshooting in dynamic environments, both cloud-based and on-premises products, is increasingly important as the popularity of such products continues to grow. As the quantities of time-sensitive data grow, conventional techniques are increasingly deficient in the management of these applications. Conventional techniques, such as relational databases, have difficulty managing large quantities of data and have limited scalability. Moreover, as monitoring analytics of these large quantities of data often have real-time requirements, the deficiencies of reliance on relational databases become more pronounced. For instance, data stored in conventional databases utilizes fixed partitioning schemes, such that query response time can be significantly impacted by the manner in which data is partitioned on disk.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DETAILED DESCRIPTION OF CERTAIN EMBODIMENTS

Figure 1:
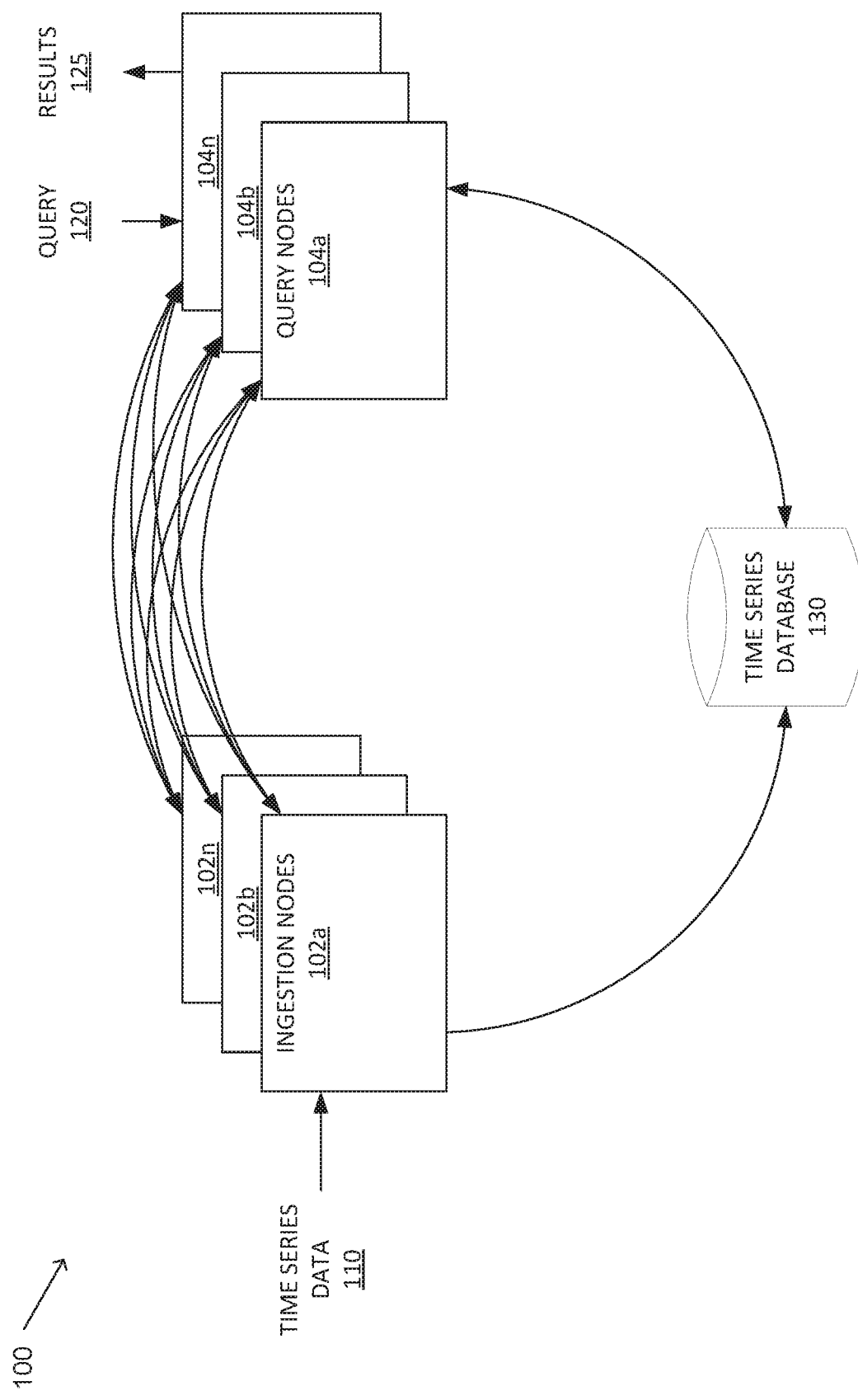
FIG. 1 is a block diagram illustrating a system for adapting time series database schema, in accordance with embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments. As denoted elsewhere herein, like element numbers are intended to indicate like elements or features.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "accessing," "analyzing," "determining," "adapting," "ingesting," "identifying," "adding," "removing," "ranking," "receiving," "dividing," "executing," "joining," "selecting," or the like, refer to the actions and processes of an electronic computing device or system such as: a host processor, a processor, a memory, a cloud-computing environment, a hyper-converged appliance, a software defined network (SDN) manager, a system manager, a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Example embodiments described herein improve the performance of computer systems by providing adaptation of time series database schema for time series data stored in a time series database.

Time series data points are stored in one or more time series databases, where the time series databases may be comprised within one or more storage devices. The time series database is partitioned into multiple shards according to a time series database schema, where a shard is a horizontal partition of the time series database. Data points include multiple searchable dimensions. In some embodiments, the data point dimensions include a metric name, a host name (e.g., source), a timestamp, a metric value, and one or more point tags. The time series database schema defines how the data points are stored, defining the dimensions used for identifying the specificity of the scan (e.g., partition or shard) and defining the dimensions stored as metadata for post-scan filtering in response to a query.

In conventional times series databases, the data points can be stored as lexicographically ordered keys that are positionally ordered such that some dimensions (e.g., metric name and host name) are on the left side of the timestamp and some dimensions (e.g., metric value and the point tags) are stored on the right side of the timestamp. The data points are stored in the time series database according to a fixed schema, whereby shards are identified by the dimensions on the left side of the time stamp. It should be appreciated that other information can be included in the data point (e.g., customer name), and that this information can also be used for identifying a shard. In general, the data points are stored within a time series database such that information related to the specificity of the scans (e.g., location on storage device) is stored separately from the information used in post-processing to filter point tags (e.g., metadata).

In performing a database query, a query is processed according to information on the left side dimensions (e.g., the metric and host) to locate storage device location to scan. The information in the point tags to be searched in a query are subject to post-filtering after the scan. Since not all data points might be needed, any data point not returned as a result of a query is dropped. In a conventional time series database, a single database scan provides all summaries for a single metric-host regardless of point tag filters, where yield is the percentage of summaries that are actually needed (e.g., after filtering) during a single database scan.

A low yield is indicative of a database schema that is not designed for efficient querying of a particular dimension. For example, if all metrics have the same metric name and host name, the database includes essentially one shard, potentially providing a low yield since all searches would return summaries for the entire database, which would then be filtered. In other examples, if metrics include a small number of hosts, or if a single shard has many tag sets and the results typically only require a small subset of the tag sets, the queries might result in low yield.

Embodiments described herein provide an autonomous, self-tuning time series database based on the data shape of the ingested data points. As described herein, the time series database schema is adaptive based on an analysis of the ingestion data shape. By analyzing the ingestion stream, certain characteristics of the time series data can be identified and exploited to improve performance (e.g., improve yield) by adapting the time series database schema. For instance, the data points are analyzed at ingestion to determine key statistics (e.g., hosts per metric, tags per host, partitionability of tag keys, etc.) and to provide suggestions as to tag keys can be used to alter the sharding scheme (e.g., the most "selective" tags, "partitioning" tags, frequent tags, changing tags etc.) In some embodiments, the database schema is automatically adapted based on the analysis. In some embodiments, configuration is provided to ensure cardinality falls within a certain range. A partitioning strategy can be determined for each stream of data ingested (e.g., on a per entity basis).

Other embodiments described herein provide an autonomous, self-tuning time series database based on the queries received over time. As described herein, the time series database schema is adaptive based on an analysis of the received queries. By analyzing the queries, the frequency of appearance of dimensions as predicates within queries can be determined. The frequency of appearance can be used to determine whether a dimension is likely to appear within a query, and can be in indication that adapting the time series database schema can be adapted to improve performance (e.g., improve yield). The query analysis, in some embodiments, can also be used to confirm whether to adapt the time series database schema based on the data shape analysis of ingested data. For example, even if the analysis of the ingestion data shape indicates that a shard should be added for a particular dimension, if the query analysis determines that the particular dimension is rarely or infrequently included as a predicate within a query, an adaptation of the time series database schema may not result in a performance improvement, and the adaptation may not be performed.

For instance, over time it can be determined that the sharding schema can be changed to store the data points according to different dimensions. For example, over time it can be determined that the best way to store the data at time $t_1$ is to shard the data by a first dimension, at time $t_2$ to shard the data by the first dimension and a second dimension, and then at time $t_3$, back to the first dimension. It should be appreciated that the historical sharding schemas are maintained so that during the ingestion of historical data the correct partitioning scheme is followed.

When querying data over long time periods, all partition schemes need to be considered. It should be appreciated that in accordance with various embodiments, the time series database schema is continuously adapting to ingestion load and requires no user interaction and that there is no re-indexing of data. Some embodiments select and utilize a partitioning scheme available for a single stream at a given time. Even as the data shapes change over time (e.g., every week), the available times series database schema can be updated and utilized.

Embodiments described herein provide methods and systems for adapting time series database schema of a time series database based on ingested data. Time series data ingested into a time series database according to a time series database schema is accessed over a time period, wherein time series data comprises a plurality of dimensions. The time series data of the time period is analyzed to determine a data shape of the time series data of the time period. It is determined whether to adapt the time series database schema based at least in part on the data shape of the time series data of the time period. In some embodiments, the time series database schema is adapted based at least in part on the data shape of the time series data of the time period. Time series data is then ingested into the time series database according to the adapted time series database schema.

Other embodiments described herein provide methods and systems for adapting time series database schema of a time series database based on received queries. A plurality of queries to a time series database received over a time period is accessed, wherein time series data is ingested into the time series database according to a time series database schema, wherein time series data comprises a plurality of dimensions. The plurality of queries of the time period is analyzed to determine a relative frequency of the plurality of dimensions within the plurality of queries over the time period. It is determined whether to adapt the time series database schema based at least in part on the relative frequency of the plurality of dimensions within the plurality of queries over the time period. In some embodiments, the time series database schema is adapted based at least in part on the queries of the time period. Time series data is then ingested into the time series database according to the adapted time series database schema.

Embodiments described herein provide a time series database including multiple time series database schemas. In some embodiments, the time series database schemas are variably partitioned, e.g., according to the methods for adapting time series database schema described above. Maintaining multiple time series database schemas within a time series database allows for improved query handling by running a query against a time series database schema that is most tuned for the particular query, thus reducing processing time by directing the query to the appropriate time series database schema based on an analysis of the query.

Embodiments described herein provided a computer-implemented method for maintaining a time series database including a plurality of time series database schemas. Time series data including data points are received at an ingestion node of a time series database, the data points comprising a plurality of dimensions. A plurality of time series database schemas of the time series database is determined for storing the time series data. The time series data is ingested according to the plurality of time series database schemas, wherein each data point is stored according to each time series database schema of the plurality of time series database schemas, such that the time series database comprises multiple instances of each data point.

Embodiments described herein provide methods for querying a variably partitioned time series database. Running a query against variably partitioned time-series data requires additional processing of the query, effectively splitting the query into multiple sub-queries. Variably partitioned time series databases include multiple time series database schemas that vary over time. The time ranges for which particular schemas are applicable is managed, such that queries are bifurcated into multiple sub-queries directed to the particular time series database schemas over the range of the query.

Embodiments described herein provide a computer-implemented method for adapting time series database schema of a time series database. Time series data ingested into a time series database according to a time series database schema is accessed over a time period, wherein time series data comprises a plurality of dimensions. The time series data of the time period is analyzed to determine a data shape of the time series data of the time period. It is determined whether to adapt the time series database schema based at least in part on the data shape of the time series data of the time period. In some embodiments, the time series database schema is adapted based at least in part on the data shape of the time series data of the time period. Time series data is then ingested into the time series database according to the adapted time series database schema.

As presented above, time series data monitoring systems typically process very large amounts of data, and query response is highly dependent on the time series database schema used to ingest the time series data. The embodiments described herein greatly extend beyond conventional methods of storing time series data in a time series database of a time series data monitoring system. For instance, adapting the time series database schema based on a data shape of the ingested data points or the received queries provides improved partitioning of the time series data. Upon query, fewer scans to the database are needed, and the yield of the performed scans is increased, providing improved results to queries, reducing the number of I/O operations, thereby improving processing and throughput. By adapting the time series database schema when appropriate, the described embodiments reduce the impact on processing and throughput of queries of time series data.

Accordingly, embodiments of the present invention amount to significantly more than merely using a computer to adapt a time series database schema. Instead, embodiments of the present invention specifically recite a novel process, rooted in computer technology, for determining whether an adaptation to the time series database schema is beneficial and, if such an adaptation is suggested, automatically performing the adaptation to improve performance of the time series data monitoring system, to overcome a problem specifically arising in the realm of monitoring time series data and querying on time series data within computer systems.

Example System for Adapting Time Series Database Schema

FIG. 1 is a block diagram illustrating an embodiment of a system 100 for adapting time series database schema of time series database 130, according to embodiments. System 100 is a distributed system including multiple ingestion nodes 102a through 102n (collectively referred to herein as ingestion nodes 102) and multiple query nodes 104a through 104n (collectively referred to herein as query nodes 104). Time series 110 is received at ingestion nodes 102 and stored within time series database 130. Query nodes 104 receive at least one query 120 for querying against time series database 130. Results 125 of query 120 are returned upon execution of query 120.

It should be appreciated that system 100 can include any number of ingestion nodes 102 and multiple query nodes 104. Ingestion nodes 102 and query nodes 104 can be distributed over a network of computing devices in many different configurations. For example, the respective ingestion nodes 102 and query nodes 104 can be implemented where individual nodes independently operate and perform separate ingestion or query operations. In some embodiments, multiple nodes may operate on a particular computing device (e.g., via virtualization), while performing independently of other nodes on the computing device. In other embodiment, many copies of the service (e.g., ingestion or query) are distributed across multiple nodes (e.g., for purposes of reliability and scalability).

Time series data 110 is received at at least one ingestion node 102a through 102n. In some embodiments, time series data includes a numerical measurement of a system or activity that can be collected and stored as a metric (also referred to as a "stream"). For example, one type of metric is a CPU load measured over time. Other examples include, service uptime, memory usage, etc. It should be appreciated that metrics can be collected for any type of measurable performance of a system or activity. Operations can be performed on data points in a stream. In some instances, the operations can be performed in real time as data points are received. In other instances, the operations can be performed on historical data. Metrics analysis include a variety of use cases including online services (e.g., access to applications), software development, energy, Internet of Things (IoT), financial services (e.g., payment processing), healthcare, manufacturing, retail, operations management, and the like. It should be appreciated that the preceding examples are non-limiting, and that metrics analysis can be utilized in many different types of use cases and applications.

In accordance with some embodiments, a data point in a stream (e.g., in a metric) includes a name, a source, a value, and a time stamp. Optionally, a data point can include one or more tags (e.g., point tags). For example, a data point for a metric may include:

A name—the name of the metric (e.g., CPU_idle, service.uptime)

A source—the name of an application, host, container, instance, or other entity generating the metric (e.g., web_server_1, app1, app2)

A value—the value of the metric (e.g., 99% idle, 1000, 2000)

A timestamp—the timestamp of the metric (e.g., 1418436586000)

One or more point tags (optional)—custom metadata associated with the metric (e.g., location=las_vegas, environment=prod)

Ingestion nodes 102 are configured to process received data points of time series data 110 for persistence and indexing. In some embodiments, ingestion nodes 102 forward the data points of time series data 110 to time series database 130 for storage. In some embodiments, the data points of time series data 110 are transmitted to an intermediate buffer for handling the storage of the data points at time series database 130. In one embodiment, time series database 130 can store and output time series data, e.g., TS1, TS2, TS3, etc. The data can include times series data, which may be discrete or continuous. For example, the data can include live data fed to a discrete stream, e.g., for a standing query. Continuous sources can include analog output representing a value as a function of time. With respect to processing operations, continuous data may be time sensitive, e.g., reacting to a declared time at which a unit of stream processing is attempted, or a constant, e.g., a 10V signal. Discrete streams can be provided to the processing operations in timestamp order. It should be appreciated that the time series data may be queried in real-time (e.g., by accessing the live data stream) or offline processing (e.g., by accessing the stored time series data).

In some embodiments, ingestion nodes 102 are also configured to analyze the data points of time series data 110 for determining whether to update the time series database schema of time series database 130. Time series data 110 ingested into a time series database according to a time series database schema is accessed over a time period. Time series data 110 of the time period is analyzed to determine a data shape of time series data 110 of the time period. Ingestion nodes 102 determine whether to adapt the time series database schema based at least in part on the data shape of time series data 110 of the time period. In some embodiments, the time series database schema is adapted based at least in part on the data shape of time series data 110 of the time period. Time series data 110 is then ingested into the time series database 130 according to the adapted time series database schema.

In some embodiments, ingestion nodes 102 and/or query nodes 104 are configured to analyze queries 120 for determining whether to update the time series database schema of time series database 130. Queries 120 received at query nodes 104 are accessed over a time period. Queries 120 of the time period are analyzed to determine a relative frequency of dimensions within queries 120 over the time period. Ingestion nodes 102 and/or query nodes 104 determine whether to adapt the time series database schema based at least in part on the relative frequency of dimensions within queries 120 over the time period. In some embodiments, the time series database schema is adapted based at least in part on the relative frequency of dimensions within queries 120 of the time period. Time series data 110 is then ingested into the time series database 130 according to the adapted time series database schema.

Figure 2:
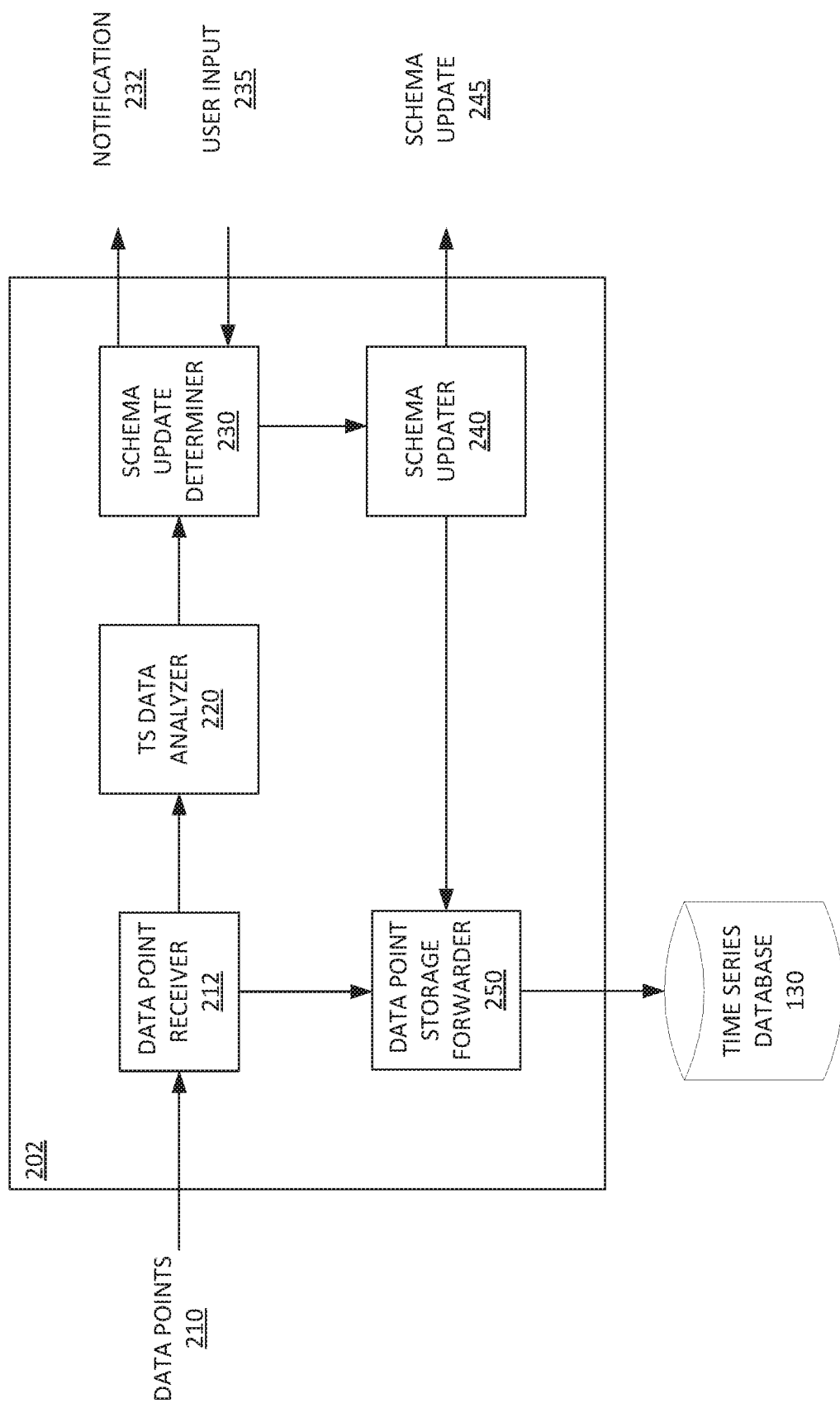
FIG. 2 is a block diagram illustrating an example ingestion node for ingesting data points of time series data and adapting a time series database schema, in accordance with embodiments.

FIG. 2 is a block diagram illustrating an embodiment of an example ingestion node 202 (e.g., one of ingestion nodes 102a through 102n of FIG. 1) for ingesting data points 210 of time series data (e.g., time series data 110) for storage in time series database 130 according to at least one time series database schema. In one embodiment, ingestion node 202 receives data points 210, determines whether to update a time series database schema, and ingests data into time series database 130 according to the updated schema. In some embodiments, the dimensionality of each time-series metric is collected to perform the analysis for determining whether to adapt the time series database schema. Ingestion node 202 includes data point receiver 212, time series data analyzer 220, schema update determiner 230, schema updater 240, and data point storage forwarder 250. It should be appreciated that ingestion node 202 is one node of a plurality of ingestion nodes of a distributed system for managing time series data (e.g., system 100).

In the example shown in FIG. 2, data points 210 are received. In one embodiment, time series data including data points 210 is received from an application or system. Data points 210 are received at data point receiver 212. Data point receiver 212 is configured to forward data points 210 to time series data analyzer 220 and data point storage forwarder 250.

Data point storage forwarder 250 is configured to store data points 210 in time series database 130 according to the time series database schema. As the time series database schema can adapt over time, at ingestion it is determined which time series database schema to use to store each particular datapoint, since the described embodiments do not require the re-indexing of the data. For instance, the proper partition scheme can be identified by identifying the timestamp of each data point to determine the partition scheme that was in use during the generation of a particular data point. It should be appreciated that different metrics in a single batch and data points from different time periods for a single metric can be ingested with different schemas.

Time series data analyzer 220 receives data points 210 and analyzes data points 210 received over a particular time period. For example, time series data analyzer 220 can analyze data points 210 received (e.g., having timestamps) over a prior 24 hour time period, a seven day time period, or any other time period. In some embodiments, time series data analyzer 220 analyzes a data shape of data points 210 over the time period. The term "data shape" as used herein refers to the contribution of different dimensions of data points 210 (e.g., how many dimensions per metric, how many hosts per metric, how many distinct points tags) and the frequency at which different dimensions are included in the data points 210.

In one embodiment, time series data analyzer 220 provides statistics used to make a determination as to whether to update the schema used for storing data points 210 in time series database 130. Examples of statistics generated includes how many tags per host, how many hosts per metric, the partitionability of tag keys, etc. The analysis performed by time series data analyzer 220 is used by schema update determiner 230 in determining whether to change the schema.

Time series data analyzer 220 is configured to analyze data points 210 over a particular time period to determine whether the time series database schema, also referred to as "sharding parameters," should be changed. A shard of time series database 130 determines the selectivity of the data stored therein. The determination as to whether to change the sharding parameters can be based on the projected selectivity and yield of time-series queries. For example, if it is projected that a particular dimension would improve the yield of queries, that dimension can be considered as a sharding parameter. In one embodiment, a scoring of the dimensions of data points 210 is performed, where the scoring is based on an analysis of the frequency of the dimensions within the data points 210. In some embodiments, the scoring is subjected to a target, such that a score that satisfies the target or best satisfies the target is indicative of a dimension that is a candidate sharding parameter.

For example, a scoring operation includes a target range of time series per partition (e.g., 10-50). The current partition scheme of the time series database schema is compared to the target and whether the current partition scheme satisfies the target. An analysis of the dimensions of data points 210 over the time series can be performed, to determine whether dimensions not used as partition parameters would improve or satisfy the target and/or to determine whether removing dimensions currently used as partition parameters would improve or satisfy the target.

In another example, time series data analyzer 220 determines the divisibility of each dimension over the streams of data points 210. In another embodiment, time series data analyzer 220 determines the cardinality of each dimension over the streams of data points 210. The divisibility and cardinality can be used by schema update determiner 230 to determine whether to adapt the schema. In one embodiment, time series data analyzer 220 performs a cardinality analysis. The cardinality analysis can take into consideration a number of factors, such as the minimum and maximum number of times a time series reports within a time period (e.g., 24 hours) and a tag partition power. Only point tags that can partition the incoming streams by the partition tag power are considered as sharding parameters.

The information generated by time series data analyzer 220 can be used to build a partition scheme on a per-metric basis that can adapt over time. For instance, over time it can be determined that the best way to store the data at time $t_1$ is to shard the data by a first dimension, at time $t_2$ to shard the data by the first dimension and a second dimension, and then at time $t_3$, back to the first dimension. It should be appreciated that the historical sharding schemas are maintained so that during the ingestion of historical data the correct partitioning scheme is followed.

Schema update determiner 230 receives analytical data from time series data analyzer 220 and is configured to make a determination regarding whether and how to change the schema for use in time series database 130. Using the analytical data, schema update determiner 230 determines whether an update to the time series database schema would improve the query performance of the time series database 130 by adapting the partition parameters. In one embodiment, changing the schema includes determining whether a dimension should be escalated as a partition parameter or deescalated to no longer be a partition parameter.

Schema update determiner 230 is configured to determine whether a change to the shading parameters of time series data 210 would improve query performance. When performing a query, in general, it is desirable to perform fewer scans against the back end (e.g., time series database 130). By making dimensions that are statistically indicative of being well-partitioned to a shading parameter, reads to the back end may be reduced. It should be appreciated that such a determination is based on analysis of previously received data points 210, and that changes to the dimensional makeup of future data points may render changes to the schema less effective.

In one embodiment, schema update determiner 230 receives scoring information from time series data analyzer. The scoring information may include a ranking of the dimensions relative to the targets defined by the scoring operation. Schema update determiner 230, using the scoring information, makes a determination as to whether a dimension should be added as a partition parameter or removed as a partition parameter. In some embodiments, schema update determiner selects the top one or two dimensions from the scoring information as partition parameters. In some embodiments, schema update determiner 230 removes the bottom one or two dimensions from the scoring information as partition parameters. It should be appreciated that some dimensions (e.g., metric or host) may not be removed as partition parameters.

In some embodiments, schema update determiner 230 automatically adapts the time series database schema according to the satisfaction of a desired partitionability of the time series data 110. In some embodiments, schema update determiner 230 determines that the time series database schema should be updated to improve performance, and generates a notification 232 for a user to confirm or effectuate the schema update. User input 235 is received to effectuate or ignore the suggested schema update.

Schema updater 240, in response to a determination from schema update determiner 230 that the time series database schema is to be updated, effectuates an update of the time series database schema. Schema updater 240 directs data point storage forwarder 250 to store data in time series database 130 according to the adapted schema by updating the data point processing performed at data point storage forwarder 250.

In one embodiment, schema updater 240 notifies other ingestion nodes 202 by transmitting schema update 245 to the other ingestion nodes (e.g., ingestion nodes 102a through 102n). In one embodiment, schema updater 240 includes a multicaster for performing the multicasting schema update 245 to a plurality of ingestion nodes.

Figure 3A:
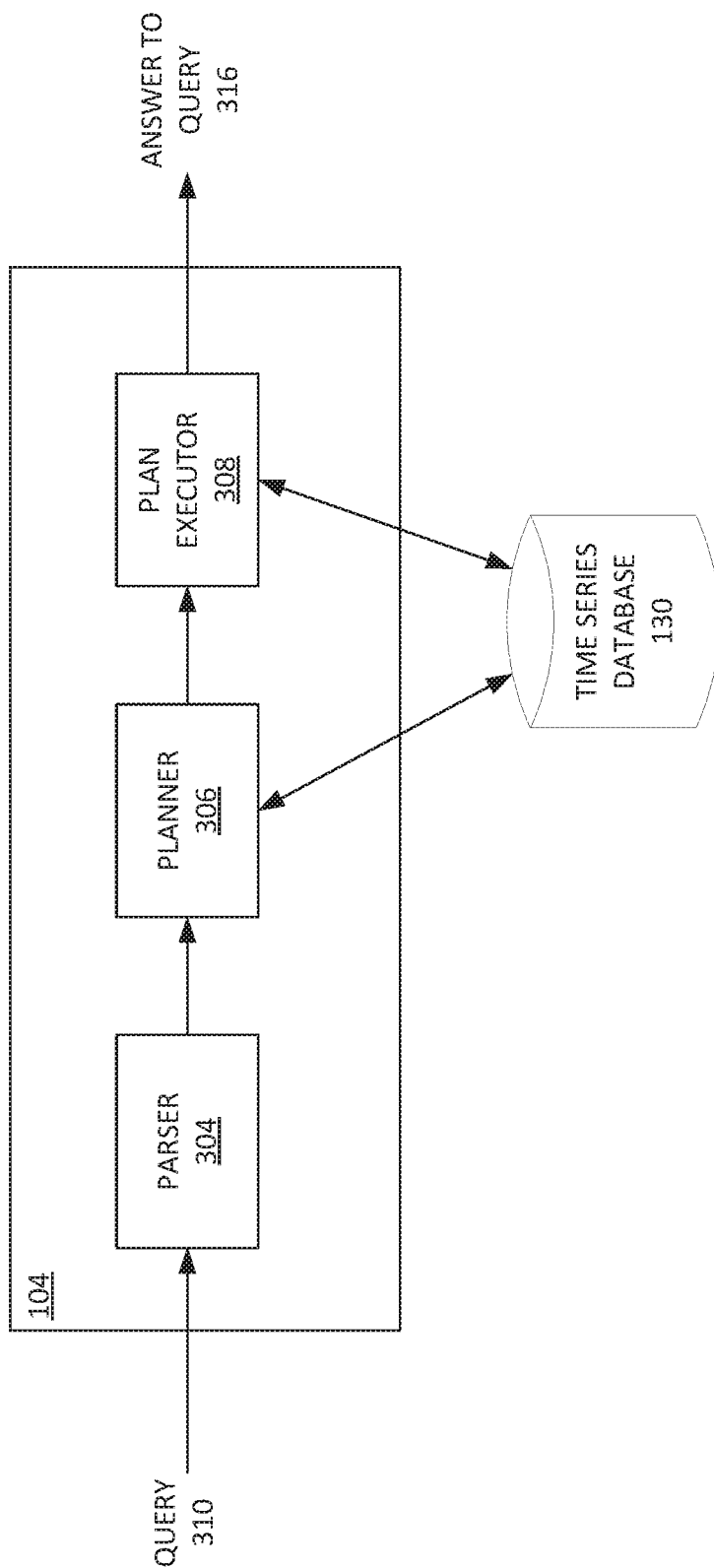
FIG. 3A is a block diagram illustrating an example query node for adapting a time series database schema, in accordance with embodiments.

FIG. 3A is a block diagram illustrating an embodiment of example query node 104 (e.g., one of query nodes 104a through 104n of FIG. 1) for adapting a time series database schema, according to embodiments. In one embodiment, query node 104 generates a query plan for the time series data based on the query 310. Query node 104 includes a parser 304, a planner 306, and an executor 308. Query node 104 can be implemented by a query execution engine configured to parse a query at parser 304, produce a query execution plan at planner 306, fetch time series data and run the time series data through processing operations, and determine an answer or response to the query at executor 308.

In the example shown in FIG. 3A, a query 310 is received. In one embodiment, the query 310 is provided by a user via a client. Time series data is provided by time series database 130. The data can include times series data, which may be discrete or continuous. Query 310 is received for searching the time series data. A query can include elements that define searchable parameters of the time series data. For example, the query can include elements defining terms related to metrics, sources, values, timestamps, and/or point tags for isolating and returning relevant results. The parser 304 receives a query 310 and parses the query for a predicate (e.g., elements and operators). The predicate forms at least part of a basis for generating a query plan. For instance, consider the example query:

--- ts("*graf", host="*2*" and tag=app and (status=production or role=app) and cluster=mon and cpu=cpu-total)

---

The example query is parsed into the predicate including the elements and operators:

- metric = "*graf*" AND
- host = "*2*" AND
- (status=production OR role=app) AND
- cluster=mon AND
- cpu=cpu-total The planner 306 receives the parsed elements and operators of query 310 and generates a query plan for retrieval of relevant time series data that resolves the query 310. The planner 306 determines operations to be performed on the relevant time series data to retrieve a result of the query 310.

In operation, planner 306 receives a query. Planner 306 generates a query plan for determining what to retrieve from time series databases 130 based on the query. For example, planner 306 determines how many scans to make on the time series database(s). The planner 306 then hands off commands (e.g., a query plan) to executor 308 to perform an execution phase, e.g., beginning execution of the query 310. The executor 308 then outputs an answer to the query 316. Although shown as a single stream, the answer to the query 316 can include one or more streams.

Figure 3B:
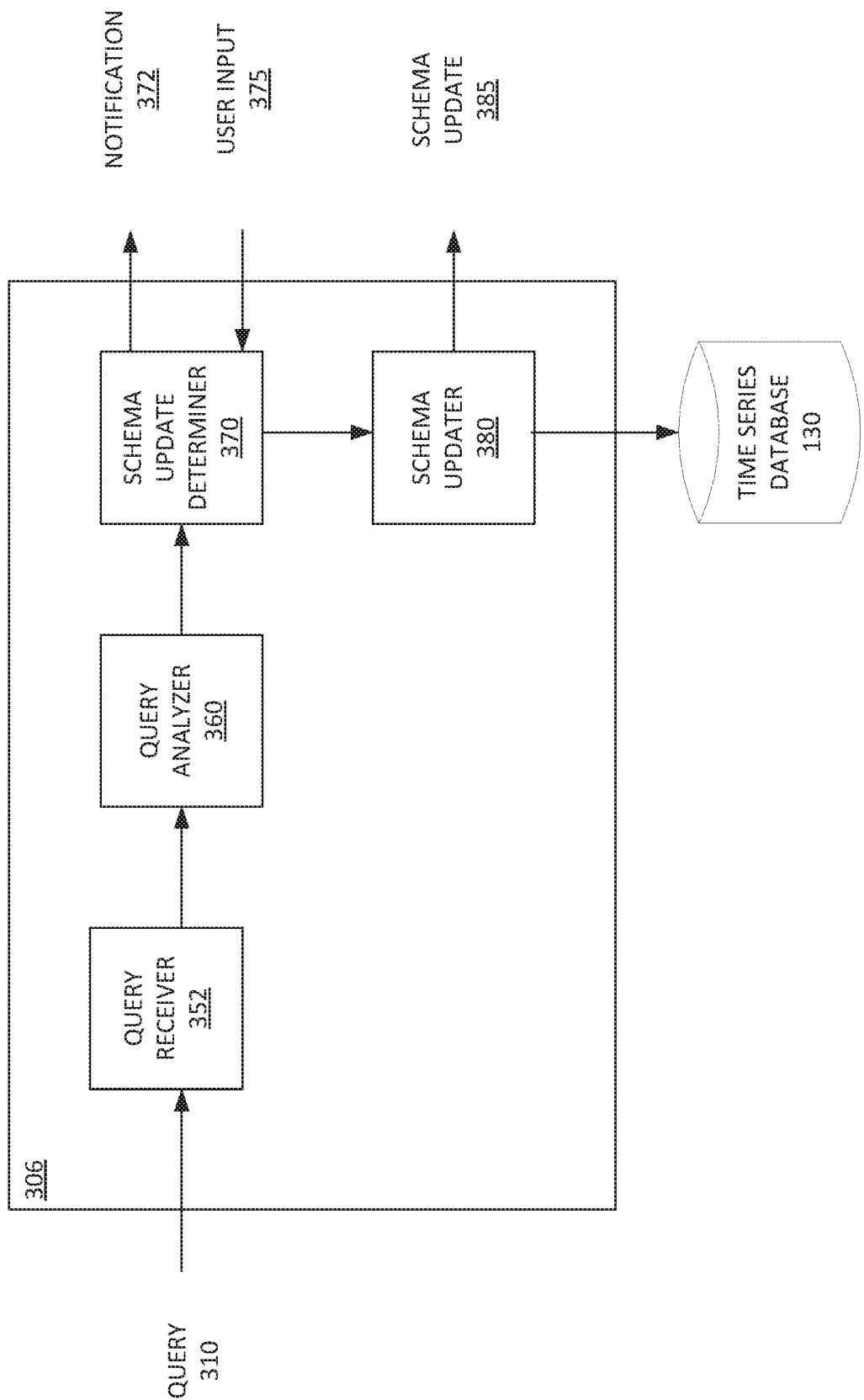
FIG. 3B is a black diagram illustrating an example query planner of a query node for adapting a time series database schema, in accordance with embodiments.

FIG. 3B is a black diagram illustrating an example query planner 306 for adapting a time series database schema, in accordance with embodiments. In the example shown in FIG. 3B, query 310 is received, where query 310 is received for searching the time series data. In one embodiment, query 310 is a parsed query received from parser 304. Query 310 is received at query receiver 352. Query receiver 352 is configured to forward query 310 to query analyzer 360.

Query analyzer 360 receives query 310 and analyzes multiple queries 310 received over a particular time period. For example, query analyzer 360 can analyze queries 310 received (e.g., having timestamps) over a prior 24 hour time period, a seven day time period, or any other time period. In some embodiments, query analyzer 360 analyzes the queries 310 of the time period to determine a relative frequency of the plurality of dimensions within the queries 310 over the time period. The relative frequency of the dimensions of queries 310 is used to determine whether adapting the time series database schema is projected to improve the performance (e.g., yield) of future queries 310.

In one embodiment, query analyzer 360 analyzes the queries 310 over the time period for use in making a determination as to whether to update the schema used for storing data points 210 in time series database 130. For example, query analyzer may collect statistics on the received queries 310, keeping track of the dimensions that are queried on. The statistics may include a count of each instance of a dimension being included in a query 310. By understanding the frequency of dimensions within queries 310, it can be determined which dimensions are queried on more frequently, and the time series database schema can be adapted to provide more efficient querying on the frequently queried terms. Similarly, if a dimension is never queried, regardless of its partitionability, it can be discarded as a partition parameter, as not be relevant to improving the performance of queries. The analysis performed by query analyzer 360 is used by schema update determiner 370 in determining whether to change the schema.

Query analyzer 360 is configured to analyze queries 310 over a particular time period to determine whether the sharding parameters should be changed. A shard of time series database 130 determines the selectivity of the data stored therein. The determination as to whether to change the sharding parameters can be based on the projected selectivity and yield of time-series queries. For example, if it is projected that a particular dimension would improve the yield of queries, that dimension can be considered as a sharding parameter.

The information generated by query analyzer 360 can be used to build a partition scheme on a per-metric basis that can adapt over time. For instance, over time it can be determined that the best way to store the data at time $t_1$ is to shard the data by a first dimension, at time $t_2$ to shard the data by the first dimension and a second dimension, and then at time $t_3$, back to the first dimension. It should be appreciated that the historical sharding schemas are maintained so that during the ingestion of historical data the correct partitioning scheme is followed.

By analyzing queries 310, for instance, it can be determined that a single time-series stream is predominantly "selected" for querying with particular predicate dimensions. For example, a cluster of time series might all be named "cpu.total" and tagged with "tenant=<some_tenant>". An analysis of the queries 310 indicates that the queries 310 are always or primarily queried with a predicate on "tenant". As such, it is known that the dimension "tenant" of the time series data is the most selective dimension. In such an example, the time series database schema can be adapted to inject a shard for the dimension "tenant" to enhance the ability to select the proper data in response to a query. It should be appreciated that the selected tenant may not yield the most partitions, but that since it is a frequent query predicate, sharding according to this predicate is likely to provide benefits to query processing.

Schema update determiner 370 receives analytical data from query analyzer 360 and is configured to make a determination regarding whether and how to change the schema for use in time series database 130. Using the analytical data, schema update determiner 370 determines whether an update to the time series database schema would improve the query performance of the time series database 130 by adapting the partition parameters. In one embodiment, changing the schema includes determining whether a dimension should be escalated as a partition parameter or deescalated to no longer be a partition parameter.

Schema update determiner 370 is configured to determine whether a change to the shading parameters of time series data 210 would improve query performance. When performing a query, in general, it is desirable to perform fewer scans against the back end (e.g., time series database 130). By making dimensions that are statistically indicative of being well-partitioned to a shading parameter, reads to the back end may be reduced. It should be appreciated that such a determination is based on analysis of previously received queries 310, and that changes to the dimensional makeup of future data points may render changes to the schema less effective.

In one embodiment, schema update determiner 370 receives statistics from query analyzer 360. The statistics may include a count of the number of times each dimension has appeared as a predicate in a query, or a relative frequency of appearance of each dimension as a predicate in a query. The statistics may include a ranking of the dimensions according to the counts. Schema update determiner 370, using the count or frequency information, makes a determination as to whether a dimension should be added as a partition parameter or removed as a partition parameter. In some embodiments, schema update determiner selects the top one or two dimensions that appear as predicates in queries. In some embodiments, schema update determiner 370 removes the one or two dimensions having the fewest counts or lowest frequency of appearance as a predicate in queries as partition parameters. It should be appreciated that some dimensions (e.g., metric or host) may not be removed as partition parameters.

In some embodiments, schema update determiner 370 automatically adapts the time series database schema according to the satisfaction of a desired partitionability of the time series data 110. In some embodiments, schema update determiner 370 determines that the time series database schema should be updated to improve performance, and generates a notification 372 for a user to confirm or effectuate the schema update. User input 375 is received to effectuate or ignore the suggested schema update.

Schema updater 380, in response to a determination from schema update determiner 370 that the time series database schema is to be updated, effectuates an update of the time series database schema. Schema updater 380 directs the ingestion nodes (e.g., ingestion nodes 102*a* through 102*n* of FIG. 1) to store data in time series database 130 according to the adapted schema by updating the data point processing (e.g., at data point storage forwarder 250 of FIG. 2). In one embodiment, schema updater 380 notifies the ingestion nodes 102 by transmitting schema update 385 to the ingestion nodes (e.g., ingestion nodes 102*a* through 102*n*). In one embodiment, schema updater 380 includes a multicaster for performing the multicasting schema update 385 to a plurality of ingestion nodes.

In some embodiments, query analyzer 360 and schema update determiner 370 can be used in combination with schema update determiner 230 of ingestion node 102. For instance, schema update determiner 230 receives analytics on the data shape of ingested data, and a particular dimension is being considered for inclusion as a sharding parameter. Schema update determiner 230 can collaborate with schema update determiner 370 to determine whether the time series database schema should be updated to include this particular dimension based on the appearance of the dimension as a predicate in queries. For example, the data shape analysis suggests that the particular dimension is partitionable and should be considered as a candidate sharding parameter. However, if the particular dimension does not appear in queries as a predicate, or has a low relative frequency of appearance, adapting the time series database schema to include this particular dimension as a sharding parameter would not improve query response performance. As such, this particular query can be removed from consideration (at this time) as a sharding parameter.

It should be appreciated that in accordance with some embodiments, query receiver 352, query analyzer 360, schema update determiner 370, and schema updater 380 may alternatively be implemented within an ingestion node 102. In such embodiments, queries 120 received at query nodes 104 are accessed by ingestion nodes 102 subsequent receipt at query nodes 104.

Hence, the embodiments of the present invention greatly extend beyond conventional methods of storing time series data in a time series database of a time series data monitoring system. For instance, adapting the time series database schema based on a data shape of the ingested data points or the queries provides improved partitioning the time series data. Upon query, fewer scans to the database are needed, and the yield of the performed scans is increased, providing improved results to queries, reducing the number of I/O operations, thereby improving processing and throughput. By adapting the time series database schema when appropriate, the described embodiments reduce the impact on processing and throughput of queries of time series data.

Accordingly, embodiments of the present invention amount to significantly more than merely using a computer to adapt a time series database schema. Instead, embodiments of the present invention specifically recite a novel process, rooted in computer technology, for determining whether an adaptation to the time series database schema is beneficial and, if such an adaptation is suggested, automatically performing the adaptation to improve performance of the time series data monitoring system, to overcome a problem specifically arising in the realm of monitoring time series data and querying on time series data within computer systems.

Example System for Maintaining a Time Series Database Including Multiple Time Series Database Schemas Embodiments described herein provide a time series database including multiple time series database schemas. In some embodiments, the time series database schemas are variably partitioned, e.g., according to the methods for adapting time series database schema described above. Maintaining multiple time series database schemas within a time series database allows for improved query handling by running a query against a time series database schema that is most tuned for the particular query, thus reducing processing time by directing the query to the appropriate time series database schema based on an analysis of the query.

In some embodiments, data points can be stored in multiple instances with different time series database schemas, e.g., when the ingestion/query patterns of particular data demands it. For example, each data point is stored N times rather than once, where N is the number of time series database schemas available. During query execution, rather than of having only one possible time series database schema at any given time, there are multiple time series database schemas to consider for different time ranges and the system chooses one time series database schema to query against. In one embodiment, the system chooses the time series database schema that is most selective (e.g., includes all the data that is the object of the query and the least amount of data to be filtered out). While the query requires all the data that is the object of the query, reducing the amount of data to be filtered is an optimization related to the yield of a scan.

Figure 4:
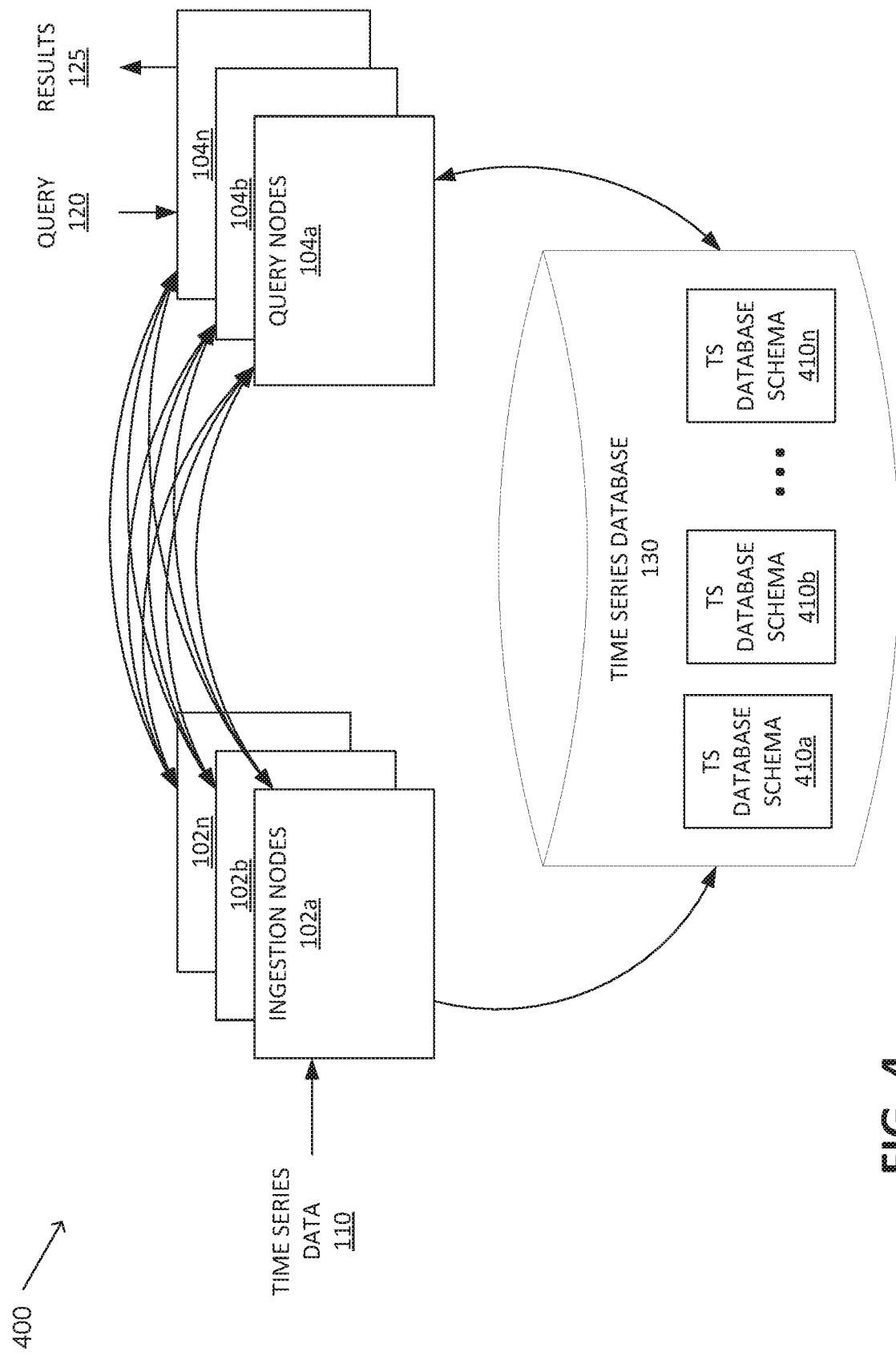
FIG. 4 is a block diagram illustrating a system for maintaining a time series database including a plurality of time series database schemas, in accordance with embodiments.

FIG. 4 is a block diagram illustrating an embodiment of a system 400 for maintaining time series database 130 including a plurality of time series database schemas 410*a* through 410*n*. System 400 operates in substantially the same manner as system 100, and can include the same components, where like element numbers are intended to indicate like elements or features.

Time series data 110 is received at ingestion nodes 102, where ingestion nodes 102 are configured to process received data points of time series data 110 for persistence and indexing. In some embodiments, ingestion nodes 102 forward the data points of time series data 110 to time series database 130 for storage. In some embodiments, the data points of time series data 110 are transmitted to an intermediate buffer for handling the storage of the data points at time series database 130. In one embodiment, time series database 130 can store and output time series data, e.g., TS1, TS2, TS3, etc. The data can include times series data, which may be discrete or continuous.

Time series database 130 includes data stored according to multiple time series database schemas, illustrated as time series database schemas 410*a* through 410*n*. It should be appreciated that time series database 130 can include time series data stored according to any number of time series database schemas, and is not intended to be limited to the illustrated embodiment. Moreover, it should be appreciated that the number of time series database schemas can vary over time (e.g., two time series database schemas from $t_0$ through $t_1$, three time series database schemas from $t_1$ through $t_2$, two times series database schemas from $t_2$ through $t_3$, etc.)

Ingestion nodes 102 receive time series data 110 including data points, where the data points include a plurality of dimensions. Ingestion nodes 102 determine the time series database schemas that are utilized upon receipt of times series data 110. As described above, it should be appreciated that the time series database schemas can adapt over time. In some embodiments, a time stamp a data point is accessed, and the time series database schema(s) applicable for the time stamp is identified. The time series data is ingested according to the plurality of time series database schemas, wherein each data point is stored in time series database 130 according to each time series database schema of the plurality of time series database schemas. As such, time series database 130 includes multiple instances of each data point, one for each time series database schema in use at the time of ingestion or according to the time stamp of the data point.

Figure 5:
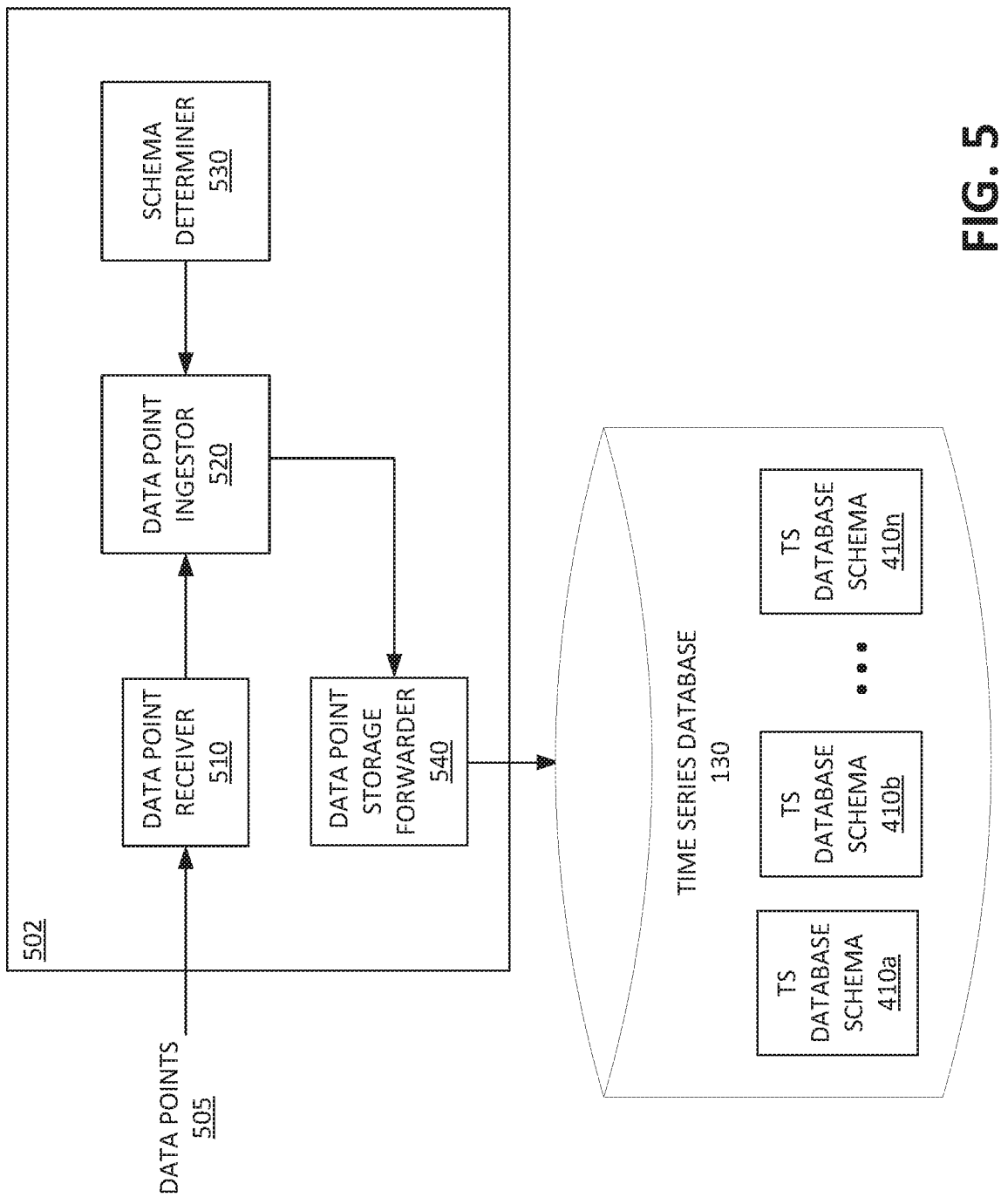
FIG. 5 is a block diagram illustrating an example ingestion node for ingesting data points of time series data according to a plurality of time series database schemas, in accordance with embodiments.

FIG. 5 is a block diagram illustrating an embodiment of an example ingestion node 502 (e.g., one of ingestion nodes 102a through 102n of FIG. 1) for ingesting data points 210 of time series data (e.g., time series data 110) for storage in time series database 130 according to a plurality of time series database schemas. It should be appreciated that ingestion node 502 can also include the components of ingestion node 202, and vice versa, and that the described operations of ingestion node 502 and ingestion node 202 are separated herein so as to not obfuscate the described embodiments.

In one embodiment, ingestion node 502 receives data points 505, and ingests data into time series database 130 according to the plurality of time series database schemas 410a through 410n. In some embodiments, the dimensionality of each time-series metric is collected to perform the analysis for determining whether to adapt the time series database schema. Ingestion node 502 includes data point receiver 510, data point ingestor 520, schema determiner 530, and data point storage forwarder 540. It should be appreciated that ingestion node 502 is one node of a plurality of ingestion nodes of a distributed system for managing time series data (e.g., system 100).

In the example shown in FIG. 5, data points 505 are received. In one embodiment, time series data including data points 505 is received from an application or system. Data points 505 are received at data point receiver 510. Data point receiver 510 is configured to forward data points 505 to data point ingestor 520.

Data point ingestor 520 is configured to format or structure data points 505 according to the plurality of time series database schemas 410a through 410n that are applicable at time series database 130. In one embodiment, data point ingestor 520 receives the applicable time series database schemas 410a through 410n from schema determiner 530. Schema determiner 530 may include information identifying the time series database schemas 410a through 410n applicable for particular time periods. For example, schema determiner may receive a schema update 245 from a schema update 240 of ingestion node 502 or another ingestion node 102.

Data point storage forwarder 540 is configured to store data points 505 in time series database 130 according to the multiple time series database schemas 410a through 410n as indicated at data point ingestor 520. As the time series database schema(s) can adapt over time, at ingestion it is determined which time series database schema(s) to use to store each particular data point, since the described embodiments do not require the re-indexing of the data. For instance, the proper partition scheme can be identified by identifying the timestamp of each data point to determine the partition scheme that was in use during the generation of a particular data point. It should be appreciated that different metrics in a single batch and data points from different time periods for a single metric can be ingested with different schemas.

Hence, the embodiments of the present invention greatly extend beyond conventional methods of storing time series data in a time series database of a time series data monitoring system. For instance, ingesting and storing time series data according to multiple time series database schemes provides improved partitioning of the time series data for improving performance of querying of the data by allowing selection of a time series database schema that provides improved performance. For instance, upon query, fewer scans to the database are needed, and the yield of the performed scans is increased, providing improved results to queries, reducing the number of I/O operations, thereby improving processing and throughput. By providing the storage of time series data according to multiple time series database schema, the described embodiments reduce the impact on processing and throughput of queries of time series data.

Accordingly, embodiments of the present invention amount to significantly more than merely using a computer to store time series data in a time series database of a time series data monitoring system. Instead, embodiments of the present invention specifically recite a novel process, rooted in computer technology, for storing time series data according to multiple time series database schemas, improving performance of query processing in a time series data monitoring system.

Example System for Querying a Variably Partitioned Time Series Database

Embodiments described herein provide methods for querying a variably partitioned time series database. Running a query against variably partitioned time-series data requires additional processing of the query, effectively splitting the query into multiple sub-queries. Variably partitioned time series databases include multiple time series database schemas that vary over time. The time ranges for which particular schemas are applicable is managed, such that queries are bifurcated into multiple sub-queries directed to the particular time series database schemas over the range of the query.

During querying time, transparent to a user, the system determines the dimensions to be scanned. In some embodiments, the time series database schema for each dimension is accessed and all available time series database schemas are loaded. On a per-dimension basis, the available time series database schemas are deduplicated and scan strategies for the time series database schemas are produced. In some embodiments, multiple time series database schemas can be considered over a single time window during querying and the system can switch between different scan strategies. For instance, from $t_1$ to $t_2$, if it is determined that the best scan strategy is X, scan strategy X is used. Then, from $t_2$ to $t_3$, the best strategy could be Y, and then again back to scan strategy X from $t_3$ to $t_4$. Smaller (by time) scans can be issued for the entire time range from $t_1$ to $t_4$ which, together with deduplication, give the best possible query execution plan. Upon completion of the scan, the data streams are joined in time-ordered fashion so that the multiple variably partitioned streams of data are presented as a single continuous ordered stream of data points.

Figure 6A:
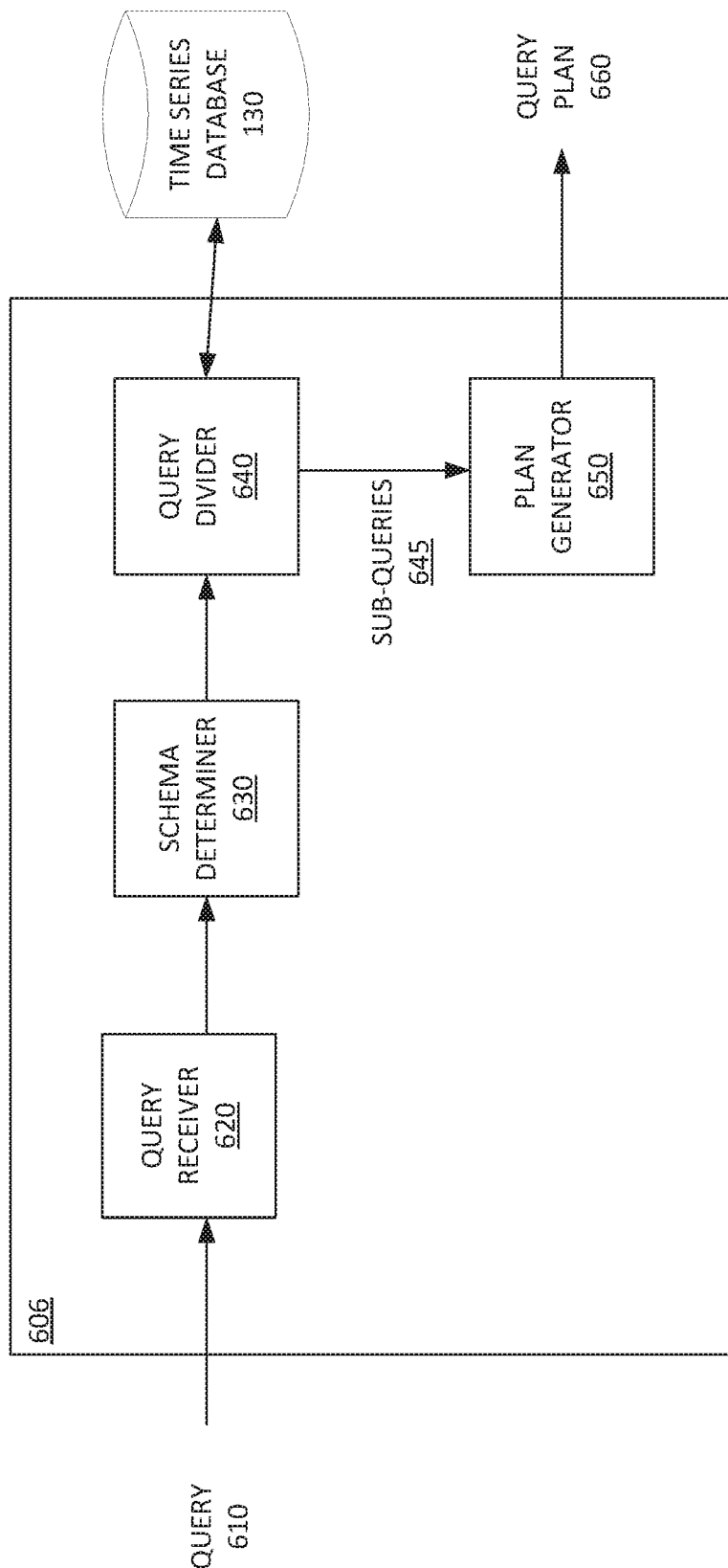
FIG. 6A is a block diagram illustrating an example query planner of a query node for querying variably partitioned time series database, in accordance with embodiments.

FIG. 6A is a block diagram illustrating an embodiment of example query planner 606 (e.g., planner 306 of FIG. 3A) of query node 104 (e.g., one of query nodes 104a through 104n of FIG. 1) for querying a variably partitioned time series database, according to embodiments. It should be appreciated that query node 606 can also include the components of query planner 306, and vice versa, and that the described operations of query node 606 and query planner 306 are separated herein so as to not obfuscate the described embodiments.

In one embodiment, query planner 606 generates a query plan for the time series data based on the query 610. In the example shown in FIG. 6A, query 610 is received, where query 610 is received for searching the time series data of variably partitioned time series database 130. Query 610 includes a time range over which query 610 is to be run and a predicate comprising at least one dimension. Time series database 130 is "variably partitioned" in that time series database 130 comprises data points stored according to multiple time series database schemas. In some embodiments, time series database 130 includes a single time series database schema for each time instance. In other embodiments, time series database 130 includes multiple time series database schemas for at least one time instance.

In one embodiment, query 610 is a parsed query received from parser 304. Query 610 is received at query receiver 620. Query receiver 620 is configured to forward query 610 to schema determiner 630.

Schema determiner 630 receives query 610 and determines at least one time series database schema corresponding to the time range. As described above, time series database 130 includes data stored according to multiple time series database schemas such that, depending on the time range, different time series database schemas may need to be scanned. Schema determiner 630 forwards the determination of the time series database schemas applicable over the time range of query 610 to query divider 640, along with query 610.

Query divider 640 divides query 610 into a plurality of sub-queries 645, wherein each sub-query 645 corresponds to one time series database schema of the plurality of time series database schemas used by time series database 130. It should be appreciated that sub-queries 645 include temporally adjacent portions of the time range of query 610. Query divider 640 forwards the sub-queries 645 to plan generator 650. Plan generator 650 generates a query plan 660 for determining what to retrieve from time series database 130 based on the sub-queries 645.

Figure 6B:
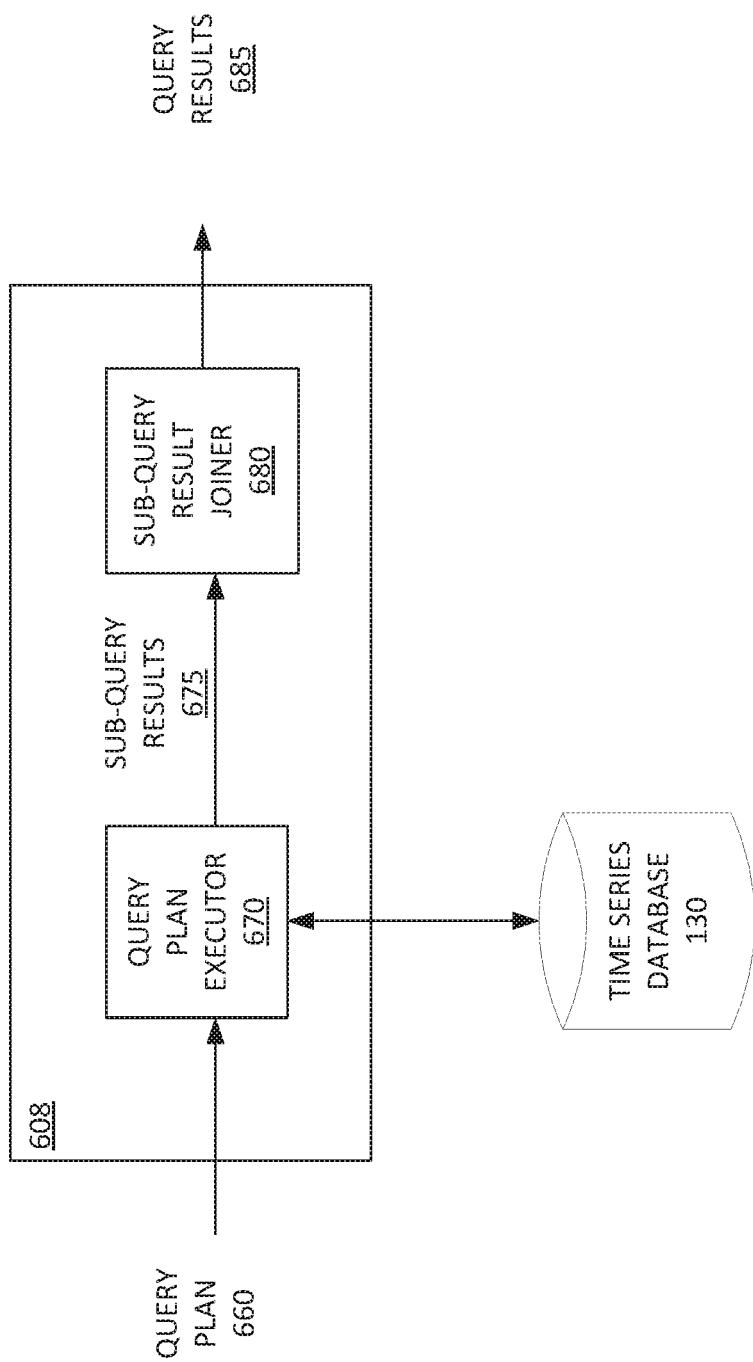
FIG. 6B is a black diagram illustrating an example query plan executor of a query node for querying variably partitioned time series database, in accordance with embodiments.

FIG. 6B is a black diagram illustrating an example plan executor 608 (e.g., plan executor 308 of FIG. 3A) of a query node 104 (e.g., one of query nodes 104a through 104n of FIG. 1) for querying variably partitioned time series database, in accordance with embodiments. Query plan 660 is received at query plan executor 670, in which query plan 660 includes multiple sub-queries. Query plan executor 670 executes the multiple sub-queries, generating sub-query results 675. Sub-query results 675 are forwarded to sub-query result joiner 680 for joining the multiple sub-query results 675 into query results 685. In this fashion, the division of query 610 into multiple sub-queries 645, and the processing of multiple sub-queries 645, is transparent to the user by generating a combined query results 685 based on query 610.

Figure 7:
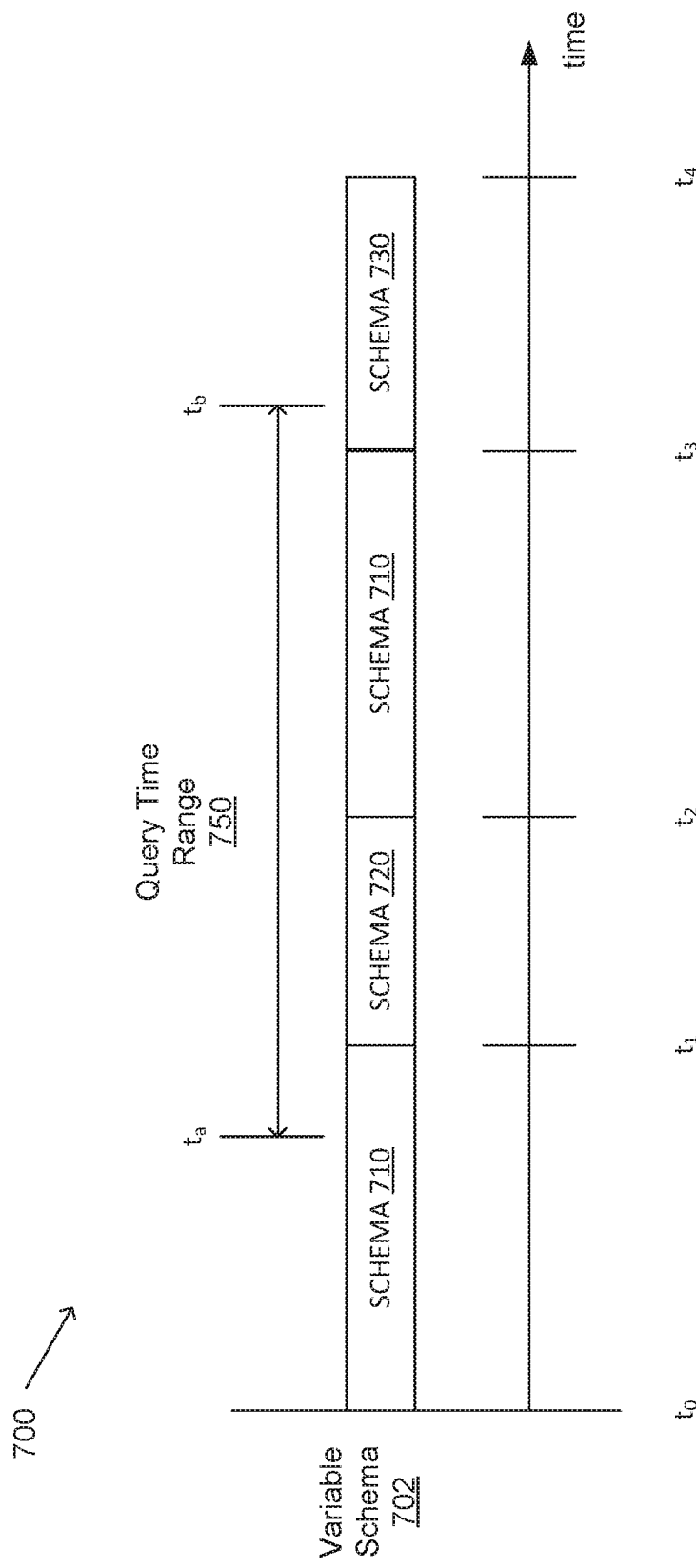
FIG. 7 is a graph illustrating an example time series database schema variability over time in a time series database including a single time series database schema for each time instance, in accordance with embodiments.

FIG. 7 is a graph 700 illustrating an example time series database schema variability over time in a time series database including a single time series database schema for each time instance, in accordance with embodiments. As illustrated in graph 700, the time series database schema for variable schema 702 varies over time (illustrated as t), e.g., due to the adaptation described above. For example, from $t_0$ through $t_1$, variable schema 702 uses time series database schema 710, from $t_1$ through $t_2$, variable schema 702 uses time series database schema 720, from $t_2$ through $t_3$, variable schema 702 uses time series database schema 710, and from $t_3$ through $t_4$, variable schema 702 uses time series database schema 730.

In the example of FIG. 7, a query is received for querying variable schema 702 over query time range 750. During querying of variable schema 702, the query node needs to determine the time series database schemas used over query time range 750. As illustrated, query time range 750 spans $t_a$ through $t_b$, where $t_a$ is between $t_0$ and $t_1$, and $t_b$ is between $t_3$ and $t_4$.

Accordingly, continuing with the example of FIG. 7, schema determiner 630 determines that variable schema 702 uses time series database schema 710 from $t_a$ through $t_1$, variable schema 702 uses time series database schema 720 from $t_1$ through $t_2$, variable schema 702 uses time series database schema 710 and from $t_2$ through $t_3$, and variable schema 702 uses time series database schema 730 from $t_3$ through $t_b$. It should be appreciated that the portion of the time range spanning $t_a$ through $t_1$ is temporally adjacent to the portion of query time range 750 spanning $t_1$ through $t_2$, the portion of the time range spanning $t_1$ through $t_2$ is temporally adjacent to the portion of query time range 750 spanning $t_2$ through $t_3$, and the portion of the time range spanning $t_2$ through $t_3$ is temporally adjacent to the portion of query time range 750 spanning $t_3$ through $t_b$.

With reference again to FIG. 6A, schema determiner 630 forwards the determination of the time series database schemas applicable over the time range of the query to query divider 640, along with the query.

Query divider 640 divides the query into four sub-queries, the first sub-query spanning $t_a$ through $t_1$ and corresponding to time series database schema 710, the second sub-query spanning $t_1$ through $t_2$ and corresponding to time series database schema 720, the third sub-query spanning $t_2$ through $t_3$ and corresponding to time series database schema 710, and the fourth sub-query spanning $t_3$ through $t_b$ and corresponding to time series database schema 730.

Query divider 640 forwards the sub-queries to plan generator 650. Plan generator 650 generates a query plan 660 for determining the data to retrieve from time series database 130 based on the sub-queries. Query plan executor 670 receives query plan 660 and executes the four sub-queries defined in query plan 660. The four sub-query results 675 are joined at sub-query result joiner 680, generating query results 685 that includes the four sub-query results 675.

Figure 8:
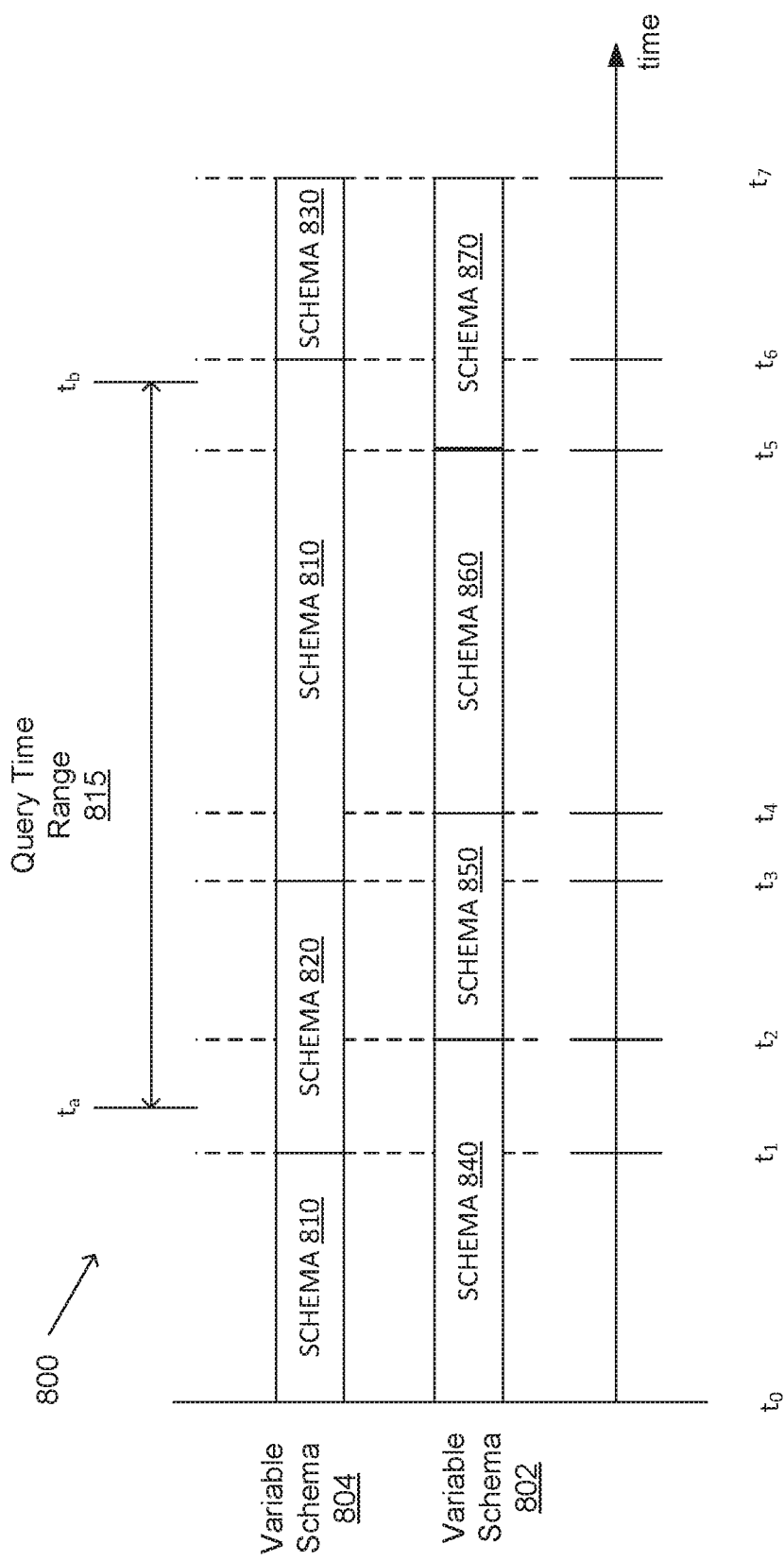
FIG. 8 is a graph illustrating an example time series database schema variability over time in a time series database including multiple time series database schemas for each time instance, in accordance with embodiments.

FIG. 8 is a graph 800 illustrating an example time series database schema variability over time in a time series database including multiple time series database schemas for each time instance, in accordance with embodiments. As illustrated in graph 800, the time series database schema for time series database schemas 802 and 804 vary over time (illustrated as t), e.g., due to the adaptation described above. For example, from $t_0$ through $t_2$, variable schema 802 uses time series database schema 840, from $t_2$ through $t_4$, variable schema 802 uses time series database schema 850, from $t_4$ through $t_5$, variable schema 802 uses time series database schema 860, and from $t_5$ through $t_7$, variable schema 802 uses time series database schema 870. Similarly, from $t_0$ through $t_1$, variable schema 804 uses time series database schema 810, from $t_1$ through $t_3$, variable schema 804 uses time series database schema 820, from $t_3$ through $t_6$, variable schema 804 uses time series database schema 810, and from $t_6$ through $t_7$, variable schema 804 uses time series database schema 830. While FIG. 8 illustrates an example including two variable schemas, it should be appreciated that embodiments described herein are applicable to any number of variable schemas within a time series database.

In the example of FIG. 8, a query is received for querying variable schema 802 and variable schema 804 over query time range 815. During querying of variable schema 802 and variable schema 804, the query node needs to determine the time series database schemas used over query time range 815. As illustrated, query time range 815 spans $t_a$ through $t_b$, where $t_a$ is between $t_1$ and $t_2$, and $t_b$ is between $t_5$ and $t_6$.

Accordingly, continuing with the example of FIG. 8, schema determiner 630 determines that variable schema 802 uses time series database schema 840 from $t_a$ through $t_2$, variable schema 802 uses time series database schema 850 from $t_2$ through $t_4$, variable schema 802 uses time series database schema 860 and from $t_4$ through $t_5$, and variable schema 802 uses time series database schema 870 from $t_5$ through $t_b$. Similarly, schema determiner 630 determines that variable schema 804 uses time series database schema 820 from $t_a$ through $t_3$, and variable schema 804 uses time series database schema 810 from $t_3$ through $t_b$.

It should be appreciated that the portion of the query time range 815 spanning $t_a$ through $t_2$, the portion of the time range spanning $t_a$ through $t_2$ is temporally adjacent to the portion of query time range 815 spanning $t_2$ through $t_3$, the portion of the time range spanning $t_2$ through $t_3$ is temporally adjacent to the portion of query time range 815 spanning $t_3$ through $t_4$, the portion of the time range spanning $t_3$ through $t_4$ is temporally adjacent to the portion of query time range 815 spanning $t_4$ through $t_5$, and the portion of the time range spanning $t_4$ through $t_5$ is temporally adjacent to the portion of query time range 815 spanning $t_5$ through $t_b$.

In some embodiments, for each temporally adjacent portion of the time range, schema determiner 630 selects a time series database schema of the multiple time series database schemas on which to execute the query. Since there are multiple time series database schema available for each temporally adjacent portion of the time range, schema determiner 630 selects one of the time series database schema upon which the query will be run. For example, for the portion of the query time range 815 spanning $t_a$ through $t_2$ schema determiner 630 selects one of schema 820 and schema 840 upon which the query will be run, for the portion of the query time range 815 spanning $t_2$ through $t_3$ schema determiner 630 selects one of schema 820 and schema 850 upon which the query will be run, for the portion of the query time range 815 spanning $t_3$ through $t_4$ schema determiner 630 selects one of schema 810 and schema 850 upon which the query will be run, for the portion of the query time range 815 spanning $t_4$ through $t_5$ schema determiner 630 selects one of schema 810 and schema 860 upon which the query will be run, and for the portion of the query time range 815 spanning $t_5$ through $t_6$ schema determiner 630 selects one of schema 810 and schema 870 upon which the query will be run.

In other embodiments, the query can be run against all available schemas for each temporally adjacent portion of the time range, and the plan executor deduplicates the results upon execution of the sub-queries.

With reference again to FIG. 6A, schema determiner 630 forwards the selection of the time series database schemas applicable over the time range of the query to query divider 640, along with the query.

Query divider 640 divides the query into five sub-queries, the first sub-query spanning $t_a$ through $t_2$ and corresponding to one of time series database schemas 820 and 840, the second sub-query spanning $t_2$ through $t_3$ and corresponding to one of time series database schemas 820 and 850, the third sub-query spanning $t_3$ through $t_4$ and corresponding to one of time series database schemas 810 and 850, the fourth sub-query spanning $t_4$ through $t_5$ and corresponding to one of time series database schemas 810 and 860, and the fifth sub-query spanning $t_5$ through $t_b$ and corresponding to one of time series database schemas 810 and 870.

Query divider 640 forwards the sub-queries to plan generator 650. Plan generator 650 generates a query plan 660 for determining the data to retrieve from time series database 130 based on the sub-queries. Query plan executor 670 receives query plan 660 and executes the five sub-queries defined in query plan 660. The five sub-query results 675 are joined at sub-query result joiner 680, generating query results 685 that includes the five sub-query results 675.

Hence, the embodiments of the present invention greatly extend beyond conventional methods of storing time series data in a time series database of a time series data monitoring system. For instance, ingesting and storing time series data according to multiple time series database schemes provides improved partitioning of the time series data for improving performance of querying of the data by allowing selection of a time series database schema that provides improved performance. For instance, upon query, fewer scans to the database are needed, and the yield of the performed scans is increased, providing improved results to queries, reducing the number of I/O operations, thereby improving processing and throughput. By providing the storage of time series data according to multiple time series database schema, the described embodiments reduce the impact on processing and throughput of queries of time series data.

Accordingly, embodiments of the present invention amount to significantly more than merely using a computer to store time series data in a time series database of a time series data monitoring system. Instead, embodiments of the present invention specifically recite a novel process, rooted in computer technology, for storing time series data according to multiple time series database schemas, improving performance of query processing in a time series data monitoring system.

Figure 9:
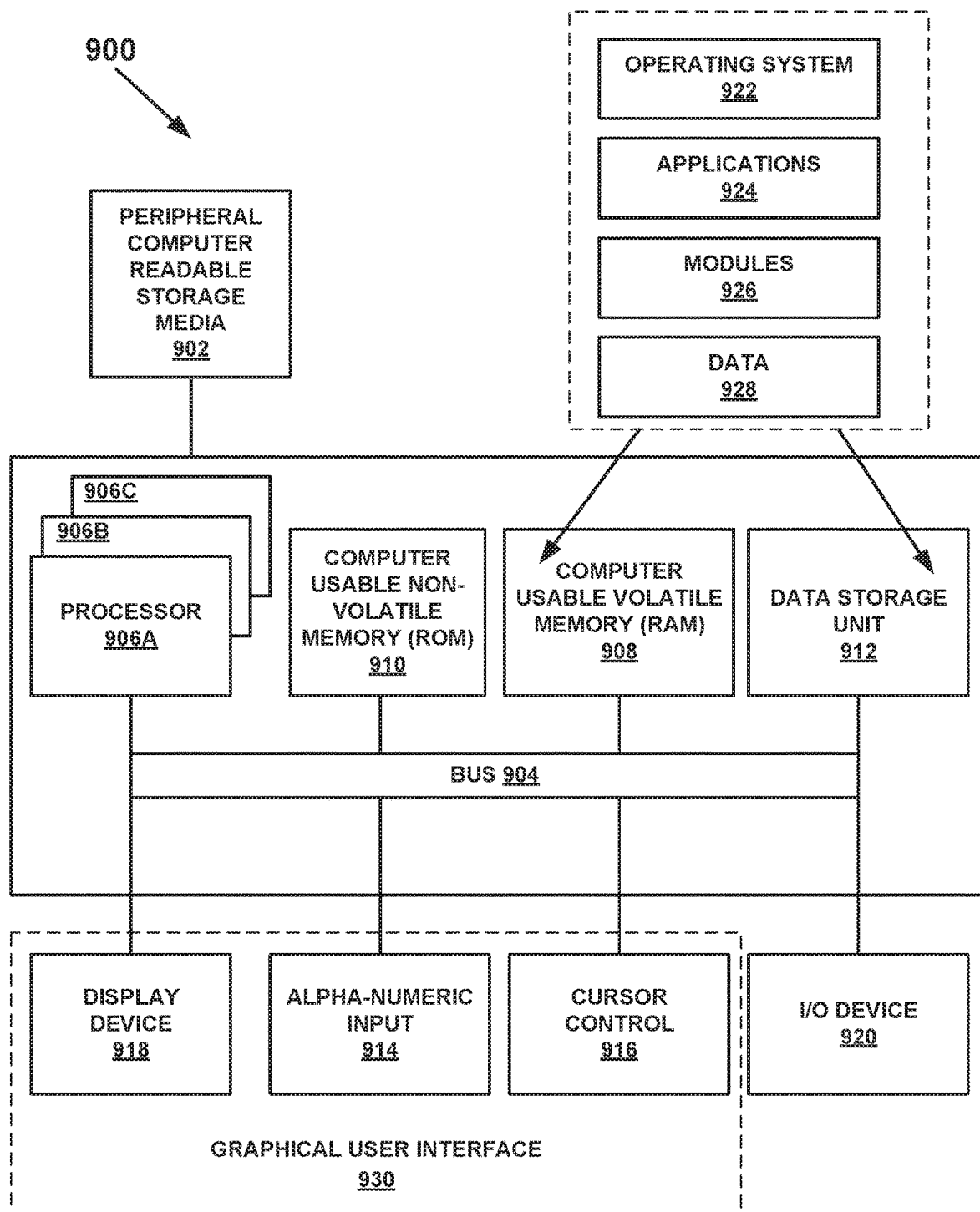
FIG. 9 is a block diagram of an example computer system upon which embodiments of the present invention can be implemented.

FIG. 9 is a block diagram of an example computer system 900 upon which embodiments of the present invention can be implemented. FIG. 9 illustrates one example of a type of computer system 900 (e.g., a computer system) that can be used in accordance with or to implement various embodiments which are discussed herein.

It is appreciated that computer system 900 of FIG. 9 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand-alone computer systems, media centers, handheld computer systems, multi-media devices, and the like. In some embodiments, computer system 900 of FIG. 9 is well adapted to having peripheral tangible computer-readable storage media 902 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 900 of FIG. 9 includes an address/data bus 904 for communicating information, and a processor 906A coupled with bus 904 for processing information and instructions. As depicted in FIG. 9, computer system 900 is also well suited to a multi-processor environment in which a plurality of processors 906A, 906B, and 906C are present. Conversely, computer system 900 is also well suited to having a single processor such as, for example, processor 906A. Processors 906A, 906B, and 906C may be any of various types of microprocessors. Computer system 900 also includes data storage features such as a computer usable volatile memory 908, e.g., random access memory (RAM), coupled with bus 904 for storing information and instructions for processors 906A, 906B, and 906C. Computer system 900 also includes computer usable non-volatile memory 910, e.g., read only memory (ROM), coupled with bus 904 for storing static information and instructions for processors 906A, 906B, and 906C. Also present in computer system 900 is a data storage unit 912 (e.g., a magnetic or optical disc and disc drive) coupled with bus 904 for storing information and instructions. Computer system 900 also includes an alphanumeric input device 914 including alphanumeric and function keys coupled with bus 904 for communicating information and command selections to processor 906A or processors 906A, 906B, and 906C. Computer system 900 also includes a cursor control device 916 coupled with bus 904 for communicating user input information and command selections to processor 906A or processors 906A, 906B, and 906C. In one embodiment, computer system 900 also includes a display device 918 coupled with bus 904 for displaying information.

Referring still to FIG. 9, display device 918 of FIG. 9 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 916 allows the computer user to dynamically signal the movement of a visible symbol (cursor) on a display screen of display device 918 and indicate user selections of selectable items displayed on display device 918. Many implementations of cursor control device 916 are known in the art including a trackball, mouse, touch pad, touch screen, joystick or special keys on alphanumeric input device 914 capable of signaling movement of a given direction or manner of displacement. Alternatively, it will be appreciated that a cursor can be directed and/or activated via input from alphanumeric input device 914 using special keys and key sequence commands. Computer system 900 is also well suited to having a cursor directed by other means such as, for example, voice commands. In various embodiments, alphanumeric input device 914, cursor control device 916, and display device 918, or any combination thereof (e.g., user interface selection devices), may collectively operate to provide a graphical user interface (GUI) 930 under the direction of a processor (e.g., processor 906A or processors 906A, 906B, and 906C). GUI 930 allows user to interact with computer system 900 through graphical representations presented on display device 918 by interacting with alphanumeric input device 914 and/or cursor control device 916.

Computer system 900 also includes an I/O device 920 for coupling computer system 900 with external entities. For example, in one embodiment, I/O device 920 is a modem for enabling wired or wireless communications between computer system 900 and an external network such as, but not limited to, the Internet. In one embodiment, I/O device 920 includes a transmitter. Computer system 900 may communicate with a network by transmitting data via I/O device 920.

Referring still to FIG. 9, various other components are depicted for computer system 900. Specifically, when present, an operating system 922, applications 924, modules 926, and data 928 are shown as typically residing in one or some combination of computer usable volatile memory 908 (e.g., RAM), computer usable non-volatile memory 910 (e.g., ROM), and data storage unit 912. In some embodiments, all or portions of various embodiments described herein are stored, for example, as an application 924 and/or module 926 in memory locations within RAM 908, computer-readable storage media within data storage unit 912, peripheral computer-readable storage media 902, and/or other tangible computer-readable storage media.

Example Methods of Operation

The following discussion sets forth in detail the operation of some example methods of operation of embodiments. With reference to FIGS. 10 through 16, flow diagrams 1000, 1100, 1200, 1300, 1400, 1500, and 1600 illustrate example procedures used by various embodiments. The flow diagrams 1000, 1100, 1200, 1300, 1400, 1500, and 1600 include some procedures that, in various embodiments, are carried out by a processor under the control of computer-readable and computer-executable instructions. In this fashion, procedures described herein and in conjunction with the flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 900). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagram, such procedures are examples. That is, embodiments are well suited to performing various other procedures or variations of the procedures recited in the flow diagram. Likewise, in some embodiments, the procedures in flow diagrams 1000, 1100, 1200, 1300, 1400, 1500, and 1600 may be performed in an order different than presented and/or not all of the procedures described in flow diagrams 1000, 1100, 1200, 1300, 1400, 1500, and 1600 may be performed. It is further appreciated that procedures described in flow diagrams 1000, 1100, 1200, 1300, 1400, 1500, and 1600 may be implemented in hardware, or a combination of hardware with firmware and/or software provided by computer system 900.

Figure 10:
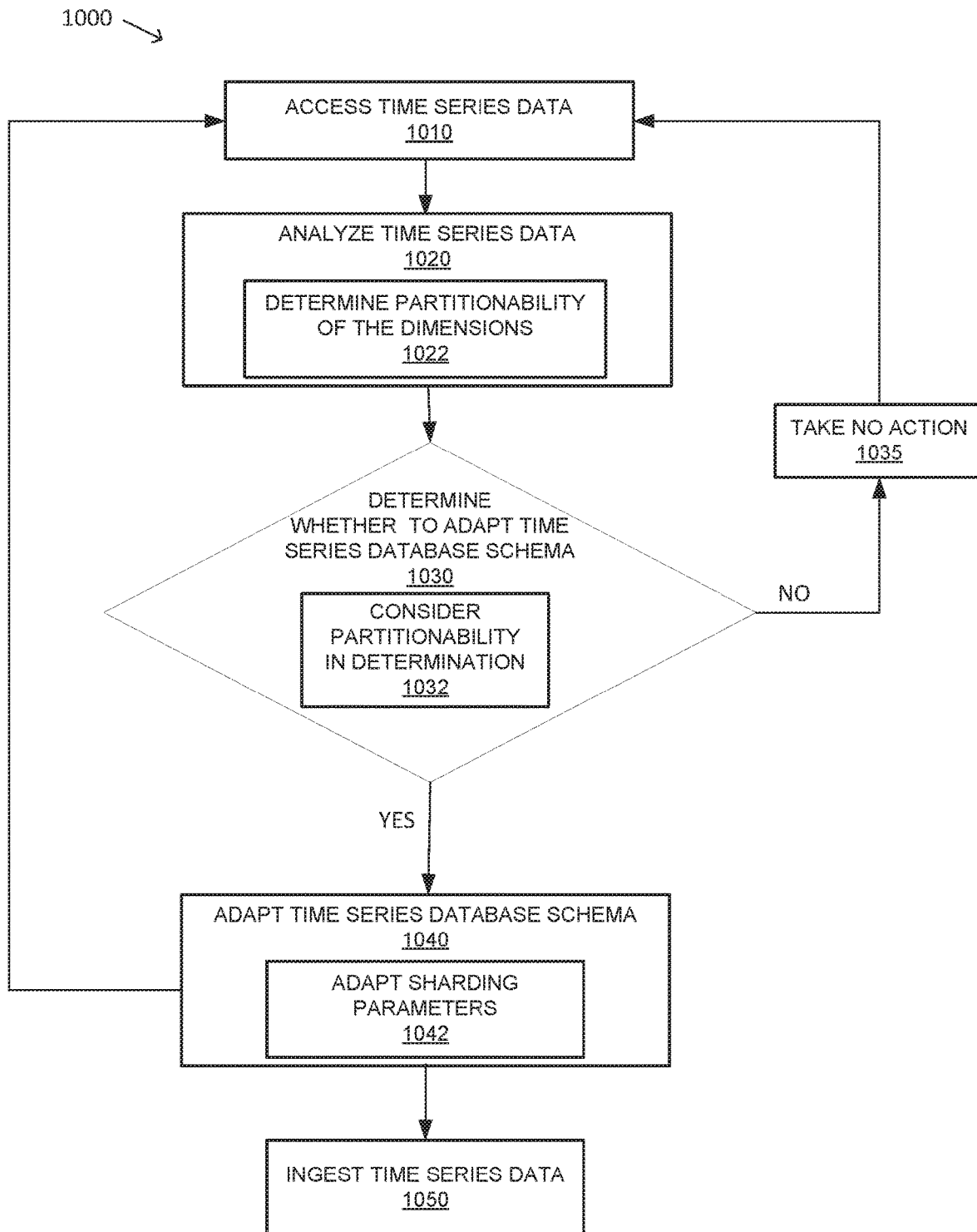
FIG. 10 depicts a flow diagram for adapting time series database schema based on received data points, according to various embodiments.

FIG. 10 depicts a flow diagram 1000 for adapting time series database schema based on received data points, according to an embodiment. At procedure 1010 of flow diagram 1000, a time series data ingested into a time series database according to a time series database schema over a time period is accessed, wherein time series data comprises a plurality of dimensions. In one embodiment, the time series database schema includes a plurality of shards, each shard corresponding to a dimension of the plurality of dimensions.

At procedure 1020, the time series data of the time period is analyzed to determine a data shape of the time series data of the time period. In one embodiment, as shown at procedure 1022, the time series data of the time period is analyzed to determine at least a partitionability of dimensions of the plurality of dimensions.

At procedure 1030, it is determined whether to adapt the time series database schema based at least in part on the data shape of the time series data of the time period. In one embodiment, as shown at procedure 1032, the determination whether to adapt the plurality of shards of the time series database schema is based at least in part on the partitionability of dimensions of the plurality of dimensions. If it is determined not to adapt the time series database schema, no action is taken, as shown at procedure 1035. In one embodiment, flow diagram 1000 returns to procedure 1010.

In one embodiment, as shown at procedure 1040, the time series database schema is adapted based at least in part on the data shape of the time series data of the time period. In one embodiment, as shown at procedure 1042, the sharding parameters of the time series database schema are adapted. In one embodiment, a shard corresponding to a dimension of the plurality of dimensions is added to the time series database schema. In one embodiment, a shard corresponding to a dimension of the plurality of dimensions is removed from the time series database schema. In one embodiment, flow diagram 1000 returns to procedure 1010.

In one embodiment, as shown at procedure 1050, time series data is ingested into the time series database according to the time series database schema. In one embodiment, procedure 1050 is performed according to flow diagram 1100 of FIG. 11.

Figure 11:
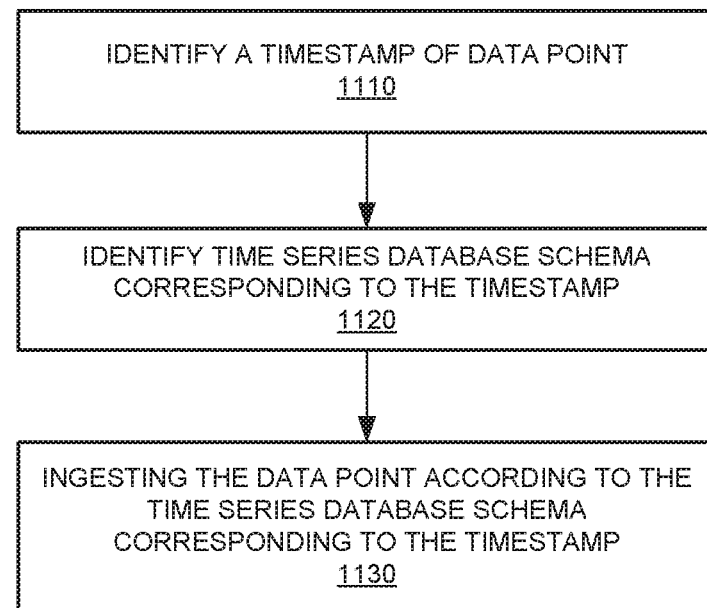
FIG. 11 depicts a flow diagram for ingesting time series data into a time series database, according to various embodiments.

FIG. 11 depicts a flow diagram 1100 for ingesting time series data into the time series database, according to an embodiment. At procedure 1110 of flow diagram 1100, a timestamp of a data point of the time series data being ingested into the time series database is identified. At procedure 1120, the time series database schema corresponding to the timestamp is identified. At procedure 1130, the data point is ingested into the time series database according to the time series database schema corresponding to the timestamp.

Figure 12:
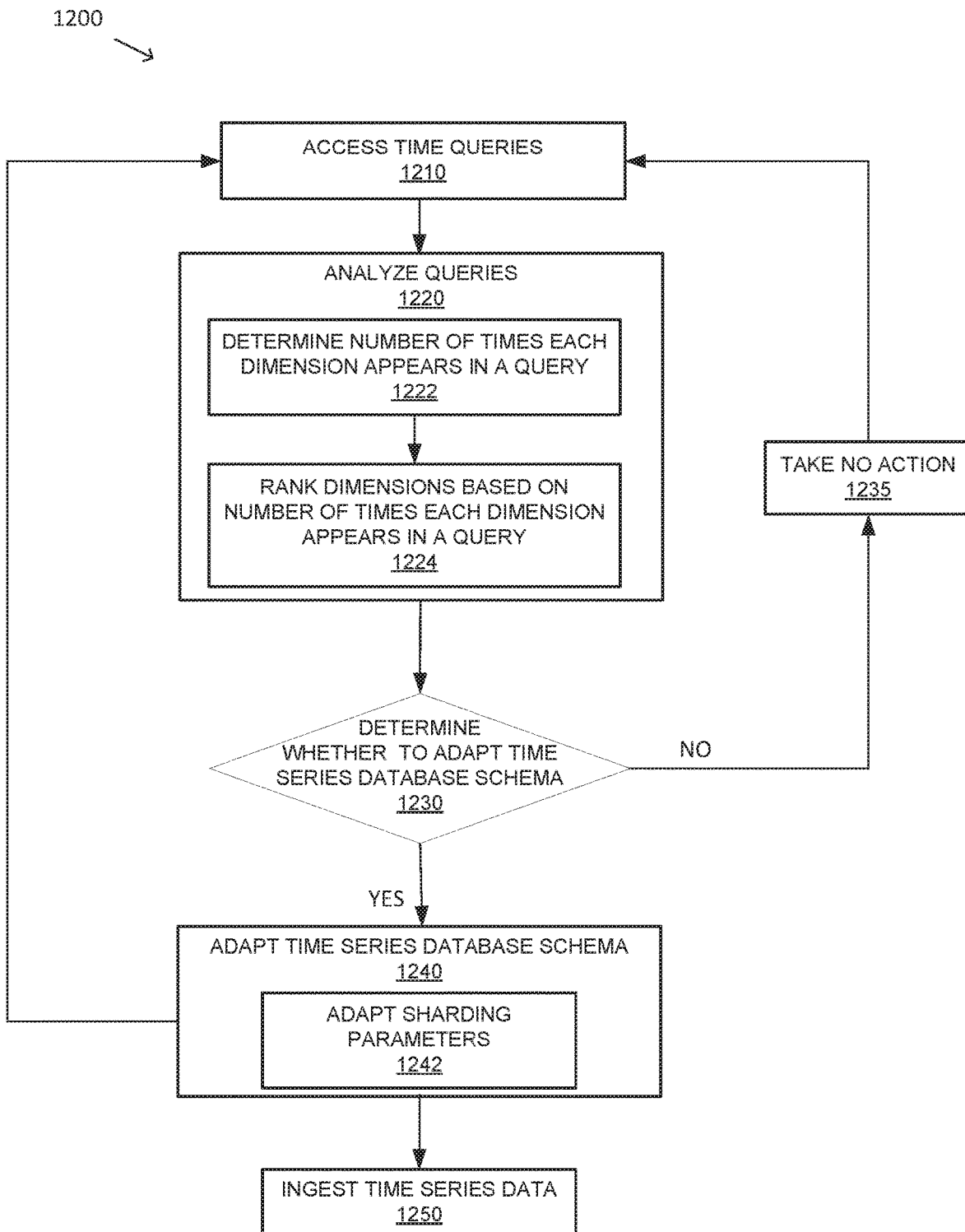
FIG. 12 depicts a flow diagram for adapting time series database schema based on analysis of received queries, according to various embodiments.

FIG. 12 depicts a flow diagram 1200 for adapting time series database schema based on analysis of received queries, according to an embodiment. At procedure 1210 of flow diagram 1200, a plurality of queries to a time series database received over a time period are accessed. The time series data is ingested into the time series database according to a time series database schema, wherein time series data comprises a plurality of dimensions. In one embodiment, the time series database schema includes a plurality of shards, each shard corresponding to a dimension of the plurality of dimensions.

At procedure 1220, the plurality of queries of the time period are analyzed to determine a relative frequency of the plurality of dimensions within the plurality of queries over the time period. In one embodiment, as shown at procedure 1222, for the plurality of dimensions, a number of times each dimension is a predicate comprised within the plurality of queries over the time period is determined. At procedure 1224, the plurality of dimensions are ranked according to the number of times each dimension is a predicate comprised within the plurality of queries over the time period to generate a dimension frequency order list.

At procedure 1230, it is determined whether to adapt the time series database schema based at least in part on the relative frequency of the plurality of dimensions within the plurality of queries over the time period. In one embodiment, the determination whether to adapt the plurality of shards of the time series database schema is based at least in part on whether the plurality of shards corresponds to at least one dimension ranked high within the dimension frequency order list. Provided the plurality of shards do not correspond to at least one dimension ranked high within the dimension frequency order list, it is determined to adapt the time series database schema. If it is determined not to adapt the time series database schema, no action is taken, as shown at procedure 1235. In one embodiment, flow diagram 1200 returns to procedure 1210.

Figure 13A:
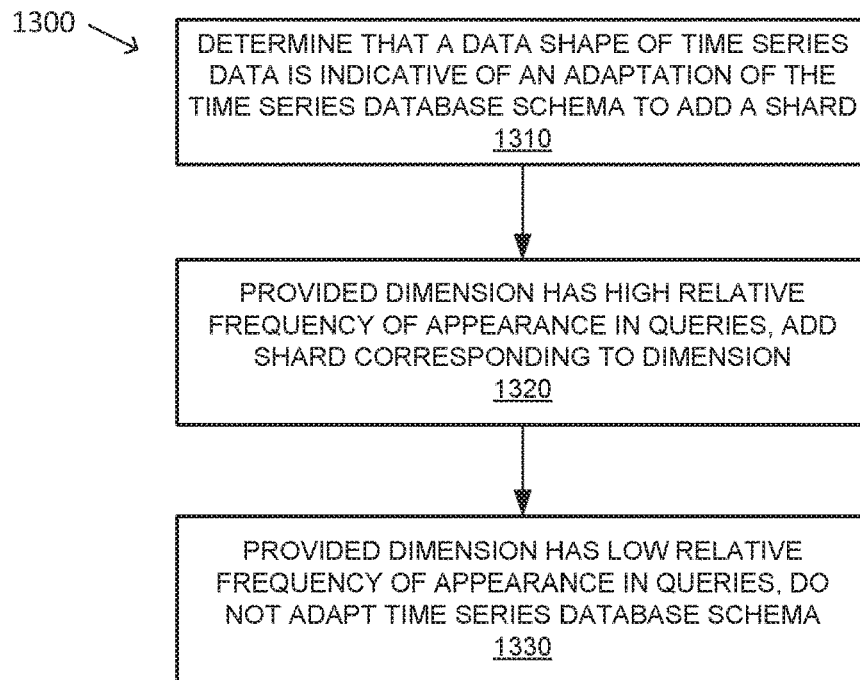
FIGS. 13A and 13B depict flow diagrams for determining whether to adapt a time series database schema, according to embodiments.

In one embodiment, procedure 1230 is performed according to flow diagram 1300 of FIG. 13A. At procedure 1310 of flow diagram 1300, it is determined that a data shape of time series data ingested into the time series database is indicative of an adaptation of the time series database schema by adding a shard corresponding to a particular dimension. At procedure 1320, provided the particular dimension has a high relative frequency of the plurality of dimensions within the plurality of queries over the time period, it is determined to adapt the time series database schema to add the shard corresponding to the particular dimension. At procedure 1330, provided the particular dimension has a low relative frequency of the plurality of dimensions within the plurality of queries over the time period, it is determined to not adapt the time series database schema.

Figure 13B:
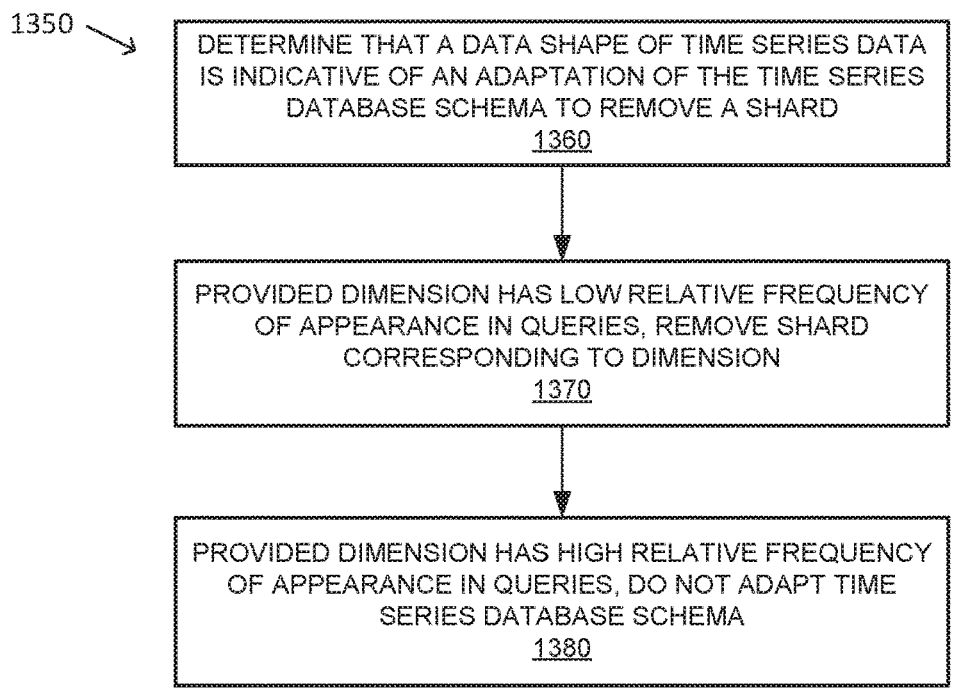

In another embodiment, procedure 1230 is performed according to flow diagram 1350 of FIG. 13B. At procedure 1360 of flow diagram 1350, it is determined that a data shape of time series data ingested into the time series database is indicative of an adaptation of the time series database schema by removing a shard corresponding to a particular dimension. At procedure 1370, provided the particular dimension has a low relative frequency of the plurality of dimensions within the plurality of queries over the time period, it is determined to adapt the time series database schema to remove the shard corresponding to the particular dimension. At procedure 1380, provided the particular dimension has a high relative frequency of the plurality of dimensions within the plurality of queries over the time period, it is determined to not adapt the time series database schema.

In one embodiment, as shown at procedure 1240, the time series database schema is adapted based at least in part on the relative frequency of the plurality of dimensions within the plurality of queries over the time period. In one embodiment, as shown at procedure 1242, the sharding parameters of the time series database schema are adapted. In one embodiment, a shard corresponding to a dimension of the plurality of dimensions having a high relative frequency within the plurality of queries over the time period is added to the time series database schema. In one embodiment, a shard corresponding to a dimension of the plurality of dimensions having a low relative frequency within the plurality of queries over the time period is removed from the time series database schema. In one embodiment, flow diagram 1200 returns to procedure 1210.

In one embodiment, as shown at procedure 1250, time series data is ingested into the time series database according to the time series database schema. In one embodiment, procedure 1250 is performed according to flow diagram 1100 of FIG. 11.

Figure 14:
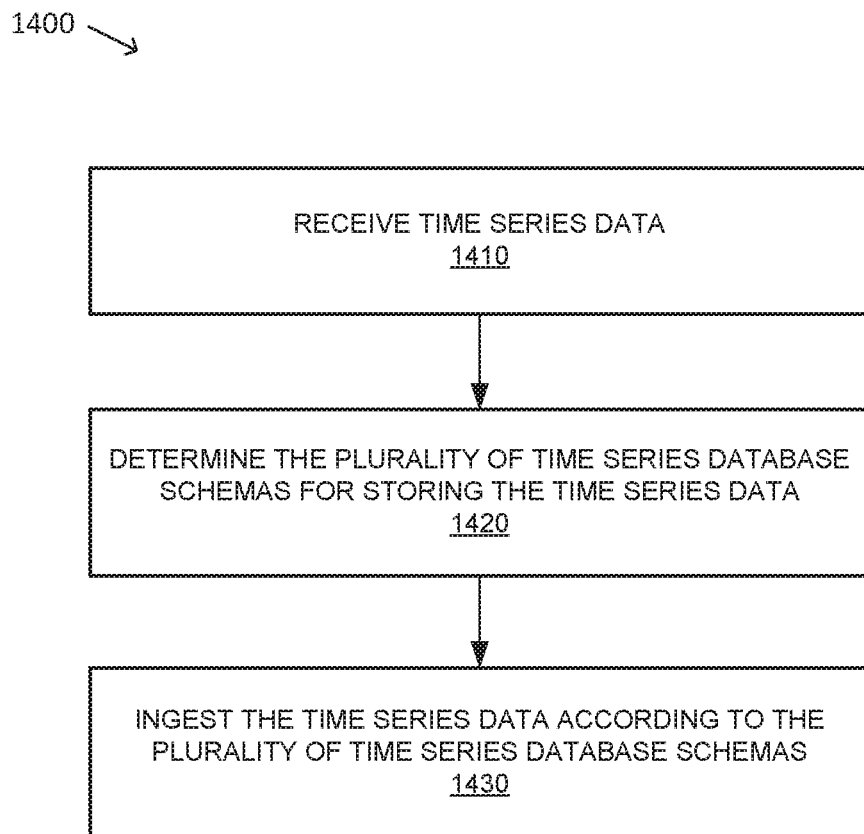
FIG. 14 depicts a flow diagram for maintaining a time series database including a plurality of time series database schemas, according to various embodiments.

FIG. 14 depicts a flow diagram 1400 for maintaining a time series database including a plurality of time series database schemas, according to various embodiments. At procedure 1410 of flow diagram 1400, time series data including data points is received at an ingestion node of a system for maintaining a time series database, where the data points include a plurality of dimensions.

At procedure 1420, a plurality of time series database schemas of the time series database is determined for storing the time series data. In some embodiments, each time series database schema of the plurality of time series database schemas includes a plurality of shards, each shard corresponding to a dimension of the plurality of dimensions.

At procedure 1430, the time series data is ingested according to the plurality of time series database schemas, wherein each data point is stored according to each time series database schema of the plurality of time series database schemas, such that the time series database comprises multiple instances of each data point.

Figure 15:
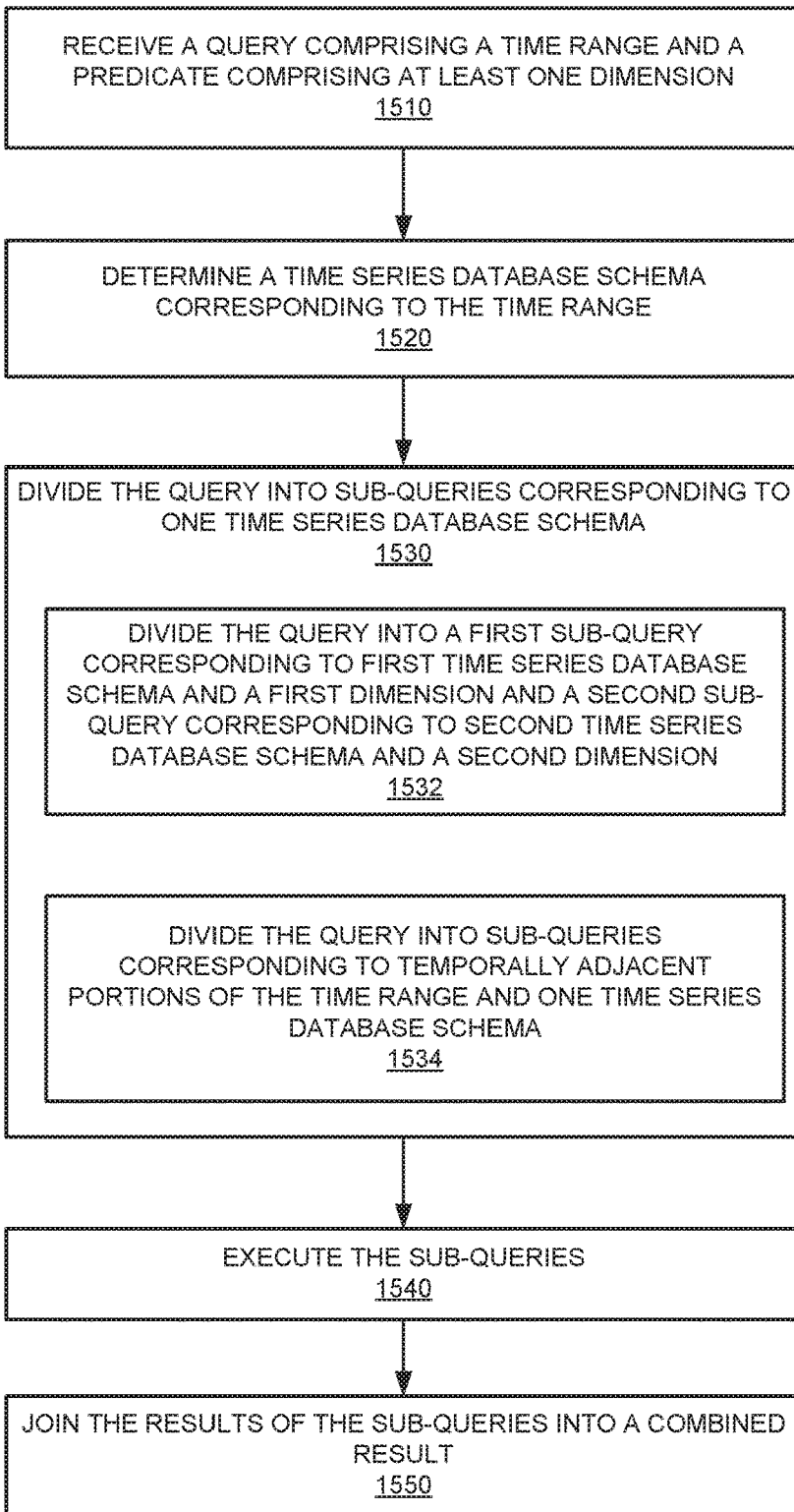
FIG. 15 depicts a flow diagram for querying a variably partitioned a time series database, according to various embodiments.
Figure 16:
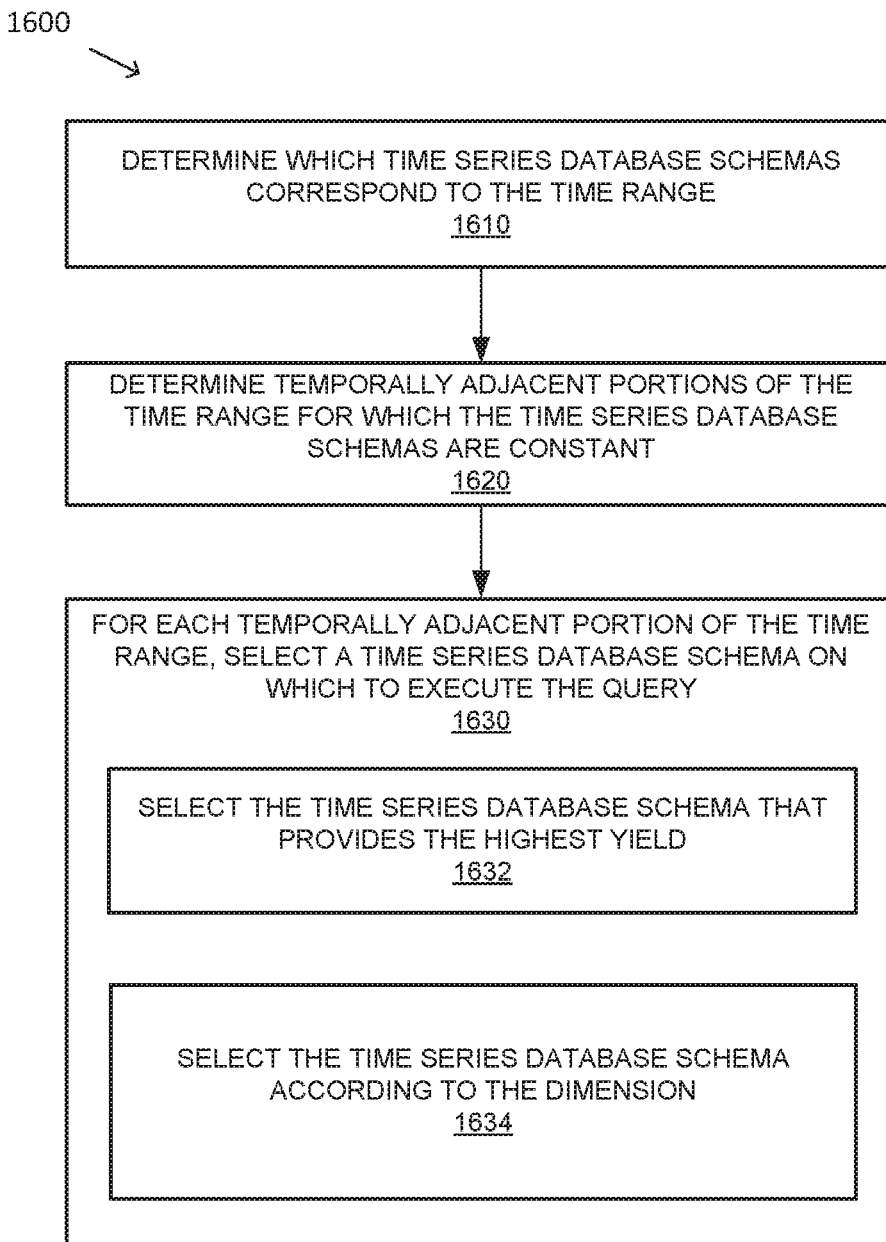
FIG. 16 depicts a flow diagram for determining the time series database schema corresponding to a time range of a query in a time series database including multiple time series database schemas for each time instance, according to various embodiments.

FIG. 15 depicts a flow diagram 1500 for querying a variably partitioned time series database, according to various embodiments. At procedure 1510 of flow diagram 1500, a query of a time series database is received, the query including a time range and a predicate comprising at least one dimension, wherein the time series database includes a plurality of time series database schemas. In one embodiment, the time series database includes a single time series database schema for each time instance. In another embodiment, the time series database includes multiple time series database schemas for at least one time instance.

At procedure 1520, at least one time series database schema of the time series database corresponding to the time range is determined. In one embodiment, where the time series database includes multiple time series database schemas for at least one time instance, procedure 1520 is performed according to flow diagram 1600 of FIG. 16. At procedure 1610 of flow diagram 1600, it is determined which of the multiple time series database schemas correspond to the time range. At procedure 1620, temporally adjacent portions of the time range for which the multiple time series database schemas are constant are determined. At procedure 1630, a time series database schema of the multiple time series database schemas on which to execute the query is selected for each temporally adjacent portion of the time range.

In one embodiment, as shown at procedure 1632, the time series database schema of the multiple time series database schemas for each temporally adjacent portion that provides a highest yield is selected. In another embodiment, as shown at procedure 1634, the time series database schema of the multiple time series database schemas according to the at least one dimension of the query is selected.

At procedure 1530, the query is divided into a plurality of sub-queries, wherein each sub-query of the plurality of sub-queries corresponds to one time series database schema of the plurality of time series database schemas. In one embodiment, as shown at procedure 1532, the query is divided into a first sub-query and a second sub-query, wherein the first sub-query corresponds to a first time series database schema of the plurality of time series database schemas and the predicate comprises a first dimension, and wherein the second sub-query corresponds to a second time series database schema of the plurality of time series database schemas and the predicate comprises a second dimension different than the first dimension. In another embodiment, as shown at procedure 1534, the query is divided into the plurality of sub-queries, each sub-query of the plurality of sub-queries corresponding to one temporally adjacent portion of the time range and one time series database schema.

At procedure 1540, the plurality of sub-queries is executed to return a plurality of results. In one embodiment, as shown at procedure 1550, the plurality of results are joined into a combined result.

It is noted that any of the procedures, stated above, regarding the flow diagrams of FIGS. 10 through 16 may be implemented in hardware, or a combination of hardware with firmware and/or software. For example, any of the procedures are implemented by a processor(s) of a cloud environment and/or a computing environment.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible, regardless the degree of virtualization. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for maintaining a time series database comprising a plurality of time series database schemas, the method comprising:

receiving time series data comprising data points at an ingestion node of a system for maintaining a time series database, the data points comprising a plurality of dimensions;

determining a plurality of time series database schemas of the time series database for storing the time series data, wherein the plurality of time series database schemas are different, and wherein at least one time series database schema of the plurality of time series database schemas is a variable schema such that the at least one time series database schema varies over time;

ingesting the time series data according to the plurality of time series database schemas, wherein each data point is stored according to each different time series database schema of the plurality of time series database schemas, such that the time series database comprises multiple instances of each data point stored according to the different time series database schemas; and generating a query plan according to a query and the plurality of time series database schemas corresponding to a time range, wherein the generating the query plan according to the query and the plurality of time series database schemas corresponding to the time range comprises:

determining temporally adjacent portions of the time range for which the plurality of time series database schemas are constant;

for each temporally adjacent portion of the time range, selecting a time series database schema of the plurality of time series database schemas on which to execute the query; and dividing the query into a plurality of sub-queries, wherein each sub-query of the plurality of sub-queries corresponds to one time series database schema of the plurality of time series database schemas.

2. The method of claim 1, further comprising:
analyzing the time series data over a time period to determine a data shape of the time series data of the time period; and
adapting at least one time series database schema of the plurality of time series database schemas based at least in part on the data shape of the time series data of the time period.

3. The method of claim 1, further comprising:
accessing a plurality of queries to a time series database received over a time period;
analyzing the plurality of queries of the time period to determine a relative frequency of the plurality of dimensions within the plurality of queries over the time period; and
adapting at least one time series database schema based at least in part on the relative frequency of the plurality of dimensions within the plurality of queries over the time period.

4. The method of claim 1, wherein each time series database schema of the plurality of time series database schemas comprises a plurality of shards, each shard corresponding to a dimension of the plurality of dimensions.

5. The method of claim 1, further comprising:
receiving the query of the time series database, the query comprising the time range and a predicate comprising at least one dimension; and
determining which of the plurality of time series database schemas correspond to the time range.

6. The method of claim 5, further comprising executing the query to return results.

7. The method of claim 5, wherein the selecting a time series database schema of the plurality of time series database schemas on which to execute the query comprises:
selecting the time series database schema of the plurality of time series database schemas for each temporally adjacent portion that provides a highest yield.

8. The method of claim 5, wherein the selecting a time series database schema of the plurality of time series database schemas on which to execute the query comprises:
selecting the time series database schema of the plurality of time series database schemas according to the at least one dimension of the query.

9. The method of claim 5, wherein the generating the query plan according to the query and the plurality of time series database schemas corresponding to the time range comprises:
determining temporally adjacent portions of the time range for which the plurality of time series database schemas are constant; and
dividing the query into a plurality of sub-queries, wherein each sub-query of the plurality of sub-queries corresponds to each time series database schema of the plurality of time series database schemas for each temporally adjacent portion of the time range.

10. A non-transitory computer readable storage medium having computer readable program code stored thereon for causing a computer system to perform a method for maintaining a time series database comprising a plurality of time series database schemas, the method comprising:
receiving time series data comprising data points at an ingestion node of a system for maintaining a time series database, the data points comprising a plurality of dimensions;
determining a plurality of time series database schemas of the time series database for storing the time series data, wherein the plurality of time series database schemas are different, and wherein at least one time series database schema of the plurality of time series database schemas is a variable schema such that the at least one time series database schema varies over time;
ingesting the time series data according to the plurality of time series database schemas, wherein each data point is stored according to each different time series database schema of the plurality of time series database schemas, such that the time series database comprises multiple instances of each data point stored according to the different time series database schemas; and
generating a query plan according to a query and the plurality of time series database schemas corresponding to a time range, wherein the generating the query plan according to the query and the plurality of time series database schemas corresponding to the time range comprises:
    determining temporally adjacent portions of the time range for which the plurality of time series database schemas are constant;
    for each temporally adjacent portion of the time range, selecting a time series database schema of the plurality of time series database schemas on which to execute the query; and
    dividing the query into a plurality of sub-queries, wherein each sub-query of the plurality of sub-queries corresponds to one time series database schema of the plurality of time series database schemas.

11. The non-transitory computer readable storage medium of claim 10, the method further comprising:
analyzing the time series data over a time period to determine a data shape of the time series data of the time period; and adapting at least one time series database schema of the plurality of time series database schemas based at least in part on the data shape of the time series data of the time period.

12. The non-transitory computer readable storage medium of claim 10, the method further comprising:
    accessing a plurality of queries to a time series database received over a time period;
    analyzing the plurality of queries of the time period to determine a relative frequency of the plurality of dimensions within the plurality of queries over the time period; and
    adapting at least one time series database schema based at least in part on the relative frequency of the plurality of dimensions within the plurality of queries over the time period.

13. The non-transitory computer readable storage medium of claim 10, wherein each time series database schema of the plurality of time series database schemas comprises a plurality of shards, each shard corresponding to a dimension of the plurality of dimensions.

14. The non-transitory computer readable storage medium of claim 10, the method further comprising:
    receiving the query of the time series database, the query comprising the time range and a predicate comprising at least one dimension; and
    determining which of the plurality of time series database schemas correspond to the time range.

15. The non-transitory computer readable storage medium of claim 14, the method further comprising executing the query to return results.

16. A system for maintaining a time series database comprising a plurality of time series database schemas, the system comprising:
    a plurality of nodes comprising a plurality of ingestion nodes and a plurality of query nodes, each node of the plurality of nodes comprising a data storage unit and a processor communicatively coupled with the data storage unit, wherein an ingestion node of the plurality of ingestion nodes is configured to:
        receive time series data comprising data points at an ingestion node of a time series database, the data points comprising a plurality of dimensions;
        determine a plurality of time series database schemas of the time series database for storing the time series data, wherein the plurality of time series database schemas are different, and wherein at least one time series database schema of the plurality of time series database schemas is a variable schema such that the at least one time series database schema varies over time;
        ingest the time series data according to the plurality of time series database schemas, wherein each data point is stored according to each different time series database schema of the plurality of time series database schemas, such that the time series database comprises multiple instances of each data point stored according to the different time series database schemas;
        generate a query plan according to a query and the plurality of time series database schemas corresponding to a time range;
        determine temporally adjacent portions of the time range for which the plurality of time series database schemas are constant;
        select a time series database schema of the plurality of time series database schemas on which to execute the query for each temporally adjacent portion of the time range; and
        divide the query into a plurality of sub-queries, wherein each sub-query of the plurality of sub-queries corresponds to one time series database schema of the plurality of time series database schemas.

17. The system of claim 16, wherein the ingestion node of the plurality of ingestion nodes is further configured to:
    analyze the time series data over a time period to determine a data shape of the time series data of the time period; and
    adapt at least one time series database schema of the plurality of time series database schemas based at least in part on the data shape of the time series data of the time period.

18. The system of claim 16, wherein the ingestion node of the plurality of ingestion nodes is further configured to:
    access a plurality of queries to a time series database received over a time period;
    analyze the plurality of queries of the time period to determine a relative frequency of the plurality of dimensions within the plurality of queries over the time period; and
    adapt at least one time series database schema based at least in part on the relative frequency of the plurality of dimensions within the plurality of queries over the time period.

19. The system of claim 16, wherein a query node of the plurality of query nodes is configured to:
    receive the query of the time series database, the query comprising the time range and a predicate comprising at least one dimension; and
    determine which of the plurality of time series database schemas correspond to the time range.

* * * * *